(12) United States Patent
Sakamoto et al.

(10) Patent No.: US 7,718,510 B2
(45) Date of Patent: May 18, 2010

(54) LASER PROCESSING METHOD AND SEMICONDUCTOR CHIP

(75) Inventors: Takeshi Sakamoto, Hamamatsu (JP); Kenshi Fukumitsu, Hamamatsu (JP)

(73) Assignee: Hamamatsu Photonics K.K., Hamamatsu-shi, Shizuoka (JP)

(*) Notice: Subject to any disclaimer, the term of this patent is extended or adjusted under 35 U.S.C. 154(b) by 406 days.

(21) Appl. No.: 10/594,949

(22) PCT Filed: Mar. 25, 2005

(86) PCT No.: PCT/JP2005/005552
§ 371 (c)(1),
(2), (4) Date: Jun. 21, 2007

(87) PCT Pub. No.: WO2005/098915
PCT Pub. Date: Oct. 20, 2005

(65) Prior Publication Data
US 2007/0290299 A1   Dec. 20, 2007

(30) Foreign Application Priority Data
Mar. 30, 2004   (JP) ............... 2004-100931

(51) Int. Cl.
*H01L 21/00* (2006.01)
(52) U.S. Cl. ............... 438/460; 438/113; 438/774; 438/797; 219/121.67; 219/121.68; 219/121.72
(58) Field of Classification Search ............... 438/460, 438/797, 113, 774, 779; 700/121; 219/121.67, 219/121.68, 121.72
See application file for complete search history.

(56) References Cited

U.S. PATENT DOCUMENTS 7,211,526 B2 * 5/2007 Iri et al. ............... 438/797

2004/0002199 A1 * 1/2004 Fukuyo et al. ............... 438/460

(Continued)

FOREIGN PATENT DOCUMENTS

EP   1 338 371   8/2003

(Continued)

OTHER PUBLICATIONS

K. Hayashi; "Inner Glass Marking by Harmonics of Solid-State Laser", Proceedings of 45$^{th}$ Laser Materials Processing Conference, Dec. 1998, pp. 23-28.

(Continued)

*Primary Examiner*—A. Sefer
*Assistant Examiner*—Farid Khan
(74) *Attorney, Agent, or Firm*—Drinker Biddle & Reath LLP

(57) ABSTRACT

A laser processing method is provided, which, even when a substrate formed with a laminate part including a plurality of functional devices is thick, can cut the substrate and laminate part with a high precision.

This laser processing method irradiates a substrate 4 with laser light L while using a rear face 21 as a laser light entrance surface and locating a light-converging point P within the substrate 4, so as to form modified regions 71, 72, 73 within the substrate 4. Here, the quality modified region 71 is formed at a position where the distance between the front face 3 of the substrate 4 and the end part of the quality modified region 71 on the front face side is 5 μm to 15 μm. When the quality modified region 71 is formed at such a position, a laminate part 16 (constituted by interlayer insulating films 17*a*, 17*b* here) formed on the front face 3 of the substrate 4 is also cut along a line to cut with a high precision together with the substrate 4.

21 Claims, 29 Drawing Sheets

U.S. PATENT DOCUMENTS

2006/0011593 A1    1/2006   Fukuyo et al.

FOREIGN PATENT DOCUMENTS

| EP | 1 570 941 A2 | 9/2005 |
|----|--------------|--------|
| EP | 1 595 637 A1 | 11/2005 |
| JP | 2002-205180 | 7/2002 |
| WO | 02/22301 | 3/2002 |

OTHER PUBLICATIONS

K. Miura et al., "Formation of Photo-Induced Structures in Glasses with Femtosecond Laser", Proceedings of $42^{nd}$ Laser Materials Processing Conference, Nov. 1997, pp. 105-111.

T. Sano et al., "Evaluation of Processing Characteristics of Silicon with Picosecond Pulse Laser", Preprints of the National Meeting of Japan Welding Society, No. 66, Apr. 2000, pp. 72-73 (with at least partial English translation).

* cited by examiner

| LIGHT-CONVERGING POSITION/ENERGY | 275 μm/7.0 μJ | 265 μm/7.0 μJ | 261 μm/7.0 μJ |
|---|---|---|---|
| REAR SIDE END PART POSITION/ WIDTH/FRONT SIDE END PART POSITION OF QUALITY MODIFIED REGION | 263 μm/22 μm/8 μm | 256 μm/22 μm/15 μm | 253 μm/22 μm/18 μm |
| CUT SECTION IMAGE (×200) THICKNESS: 300 μm UPPER SIDE: REAR FACE (LASER LIGHT ENTRANCE SURFACE) LOWER SIDE: FRONT FACE (DEVICE SURFACE) |  |  |  |
| SKIRT WIDTH S | 0 μm | 2 μm | 4 μm | ized is irradiated with laser light while locating a light-
LASER PROCESSING METHOD AND SEMICONDUCTOR CHIP

TECHNICAL FIELD

The present invention relates to a laser processing method used for cutting a substrate formed with a laminate part including a plurality of functional devices, and a semiconductor chip cut by using such a laser processing method.

BACKGROUND ART

Known as a conventional technique of this kind is a laser processing method in which a wafer-like object to be processed is irradiated with laser light while locating a light-converging point within the object, so as to form a plurality of rows of modified regions within the object along a line to cut, and use the modified regions as start points for cutting (see, for example, Patent Document 1).

[Patent Document 1] Japanese Patent Application Laid-Open No. 2002-205180

DISCLOSURE OF THE INVENTION

Problem to be Solved by the Invention

The above-mentioned laser processing method is a technique which becomes particularly effective when the object to be processed is thick. In connection with such a technique, there have been demands for a technology which uses a substrate formed with a laminate part including a plurality of functional devices as an object to be processed and can cut the substrate and laminate part with a high precision even when the substrate is thick.

In view of such circumstances, it is an object of the present invention to provide a laser processing method which, even when a substrate formed with a laminate part including a plurality of functional devices is thick, can cut the substrate and laminate part with a high precision; and a semiconductor chip cut by using such a laser processing method.

Means for Solving Problem

For achieving the above-mentioned object, in one aspect, the present invention provides a laser processing method of irradiating a substrate having a front face formed with a laminate part including a plurality of functional devices with laser light while locating a light-converging point within the substrate so as to form a modified region to become a start point for cutting within the substrate along a line to cut of the substrate, the method comprising the steps of forming a first modified region along the line to cut at a position where a distance between the front face and an end part on the front face side is 5 μm to 15 μm; and forming at least one row of a second modified region along the line to cut at a position between the first modified region and a rear face of the substrate.

In another aspect, the present invention provides a laser processing method of irradiating a substrate having a front face formed with a laminate part including a plurality of functional devices with laser light while locating a light-converging point within the substrate so as to form a modified region to become a start point for cutting within the substrate along a line to cut of the substrate, the method comprising the steps of forming a first modified region along the line to cut at a position where a distance between the front face and an end part on a rear face side is [(the substrate thickness)×0.1] μm to [20+(the substrate thickness)×0.1] μm; and forming at least one row of a second modified region along the line to cut at a position between the first modified region and a rear face of the substrate.

When an expandable film such as expandable tape is bonded to the rear face of the substrate and expanded, for example, in these laser processing methods, fractures extending along the line to cut occur from the first and second modified regions acting as start points, whereby the substrate can be cut along the line to cut even when the substrate is thick. When the first modified region is formed at a position where the distance between the front face of the substrate and the end part of the first modified region on the front face side is 5 μm to 15 μm or a position where the distance between the front face of the substrate and the end part of the first modified region on the rear face side is [(the substrate thickness)×0.1] μm to [20+(the substrate thickness)×0.1] μm, the laminate part formed on the front face of the substrate can also be cut along the line to cut with a high precision. Therefore, even when the substrate formed with the laminate part including a plurality of functional devices is thick, these laser processing methods can cut the substrate and laminate part with a high precision.

Here, the functional devices refer to semiconductor operating layers formed by crystal growth, light-receiving devices such as photodiodes, light-emitting devices such as laser diodes, and circuit devices formed as circuits, for example. The distance refers to a distance along the thickness of the substrate unless otherwise specified (ditto in the following). The first and second modified regions are formed when the substrate is irradiated with laser light while locating a light-converging point within the semiconductor substrate so as to generate multiphoton absorption or optical absorption equivalent thereto within the substrate.

In the former laser processing method, it will be preferred if the first modified region is formed at a position where the distance between the front face of the substrate and the end part of the first modified region on the front face side is 5 μm to 10 μm. In the latter laser processing method, the first modified region is preferably formed at a position where the distance between the front face of the substrate and the end part of the first modified region on the rear face side is [5+(the substrate thickness)×0.1] μm to [20+(the substrate thickness)×0.1] μm, more preferably at a position where the distance between the front face of the substrate and the end part of the first modified region on the rear face side is [5+(the substrate thickness)×0.1] μm to [10+(the substrate thickness)×0.1] μm. In these cases, the end part of the substrate on the front face side and the laminate part can be cut along the line to cut with a higher precision.

In the above-mentioned laser processing methods, there is a case where the substrate is a semiconductor substrate while the first and second modified regions include a molten processed region. When the substrate is a semiconductor substrate, there is a case where modified regions including a molten processed region are formed as the first and second modified regions.

Preferably, in the above-mentioned laser processing methods, the first and second modified regions are successively formed one by one from the side farther from the rear face while using the rear face as a laser light entrance surface. In this case, no modified region exists between the rear face (laser light entrance surface) of the substrate and the light-converging point of laser light when forming each modified region, so that scattering, absorption, and the like of laser light are not caused by modified regions which have already been formed. Therefore, each modified region can be formed with a high precision.

Preferably, in the above-mentioned laser processing methods, the laser light has an energy of 2 µJ to 50 µJ when forming the first modified region. This is because fractures starting from the first modified region tend to reach the laminate part with a high precision along the line to cut at the time of cutting the substrate and laminate part when the first modified region is formed under such a condition. When the laser light energy is less than 2 µJ, fractures starting from the first modified region are likely to reach the laminate part while deviating from the line to cut at the time of cutting the substrate and laminate part. When the laser light energy exceeds 50 µJ, on the other hand, damages such as melting are likely to occur in the laminate part.

Preferably, in the above-mentioned laser processing methods, the laser light has an energy of 1 µJ to 50 µJ when forming the second modified region. This is because fractures starting from the second modified region tend to reach the laminate part with a high precision along the line to cut at the time of cutting the substrate and laminate part when the second modified region is formed under such a condition. When the laser light energy is less than 1 µJ, fractures starting from the second modified region are harder to occur at the time of cutting the substrate and laminate part. When the laser light energy exceeds 50 µJ, on the other hand, fractures starting from the second modified region are likely to deviate from the line to cut at the time of cutting the substrate and laminate part.

Preferably, in the above-mentioned laser processing methods, the light-converging point of the laser light is located at a position distanced by 50 µm to [(the substrate thickness)× 0.9] µm from the rear face when forming the second modified region. This is because the substrate and laminate part can be cut easily even when the substrate is thick if the second modified region is formed under such a condition.

Preferably, in the above-mentioned laser processing methods, the light-converging point of the laser light is located at a position distanced by 20 µm to 110 µm from the rear face when forming the second modified region. This is because fractures starting from the second modified region tend to reach the rear face of the substrate reliably when the second modified region is formed under such a condition. When the distance from the rear face is less than 20 µm, damages such as melting are likely to occur in the rear face of the substrate. When the distance from the rear face exceeds 110 µm, on the other hand, fractures starting from the second modified region are harder to reach the rear face of the substrate.

The above-mentioned laser processing methods may further comprise the step of cutting the substrate and laminate part along the line to cut. Because of the reasons mentioned above, even when the substrate formed with the laminate part including a plurality of functional devices is thick, the substrate and laminate part can be cut along the line to cut with a high precision.

In still another aspect, the present invention provides a semiconductor chip comprising a substrate; and a laminate part, disposed on a front face of the substrate, including a functional device; wherein a first modified region extending along a rear face of the substrate is formed at a position where a distance between the front face and an end part on the front face side is 5 µm to 15 µm in a side face of the substrate; and wherein at least one row of a second modified region extending along the rear face is formed at a position between the first modified region and the rear face in the side face of the substrate.

In still another aspect, the present invention provides a semiconductor chip comprising a substrate; and a laminate part, disposed on a front face of the substrate, including a functional device; wherein a first modified region extending along a rear face of the substrate is formed at a position where a distance between the front face and an end part on the rear face side is [(the substrate thickness)×0.1] µm to [20+(the substrate thickness)×0.1] µm in a side face of the substrate; and wherein at least one row of a second modified region extending along the rear face is formed at a position between the first modified region and the rear face in the side face of the substrate.

These semiconductor chips are considered to be those cut by using the above-mentioned laser processing methods, whereby the side face of the substrate formed with the first and second modified regions and the side face of the laminate part are highly accurate cut sections in which irregularities are suppressed.

In the above-mentioned semiconductor chips, there is a case where the substrate is a semiconductor substrate while the first and second modified regions include a molten processed region. When the substrate is a semiconductor substrate, there is a case where modified regions including a molten processed region are formed as the first and second modified regions.

In the above-mentioned semiconductor chips, the distance between the end part of the first modified region on the rear face side and the end part of the second modified region on the front face side opposing each other is preferably 0 µm to [(the substrate thickness)–(the substrate thickness)×0.6] µm. This is because, when the first and second modified regions are formed under such a condition, fractures starting from the modified regions tend to occur along the line to cut with a high precision, whereby the side faces of the substrate and laminate part in the semiconductor chip become highly accurate cut sections. When the distance between the end part of the first modified region on the rear face side and the end part of the second modified region on the front face side opposing each other exceeds [(the substrate thickness)–(the substrate thickness)×0.6] µm, side faces of the substrate of the semiconductor chip are harder to become highly accurate cut sections between the first and second modified regions at the time of cutting the substrate and laminate part.

Effect of the Invention

Even when a substrate formed with a laminate part including a plurality of functional devices is thick, the present invention can cut the substrate and laminate part with a high precision.

EXPLANATIONS OF NUMERALS

1 . . . object to be processed; 3 . . . front face; 4 . . . substrate; 4a . . . cut section (side face); 5 . . . line to cut; 7 . . . modified region; 8 . . . starting point region for cutting; 13 . . . molten processed region; 15 . . . functional device; 16 . . . laminate part; 21 . . . rear face; 24 . . . fracture; 25 . . . semiconductor chip; 71 . . . quality modified region (first modified region); 72 . . . segmented modified region (second modified region); 73 . . . HC modified region (second modified region); L . . . laser light; P . . . light-converging point.

Best Modes for Carrying Out the Invention

In the following, preferred embodiments of the method of cutting an object to be processed in accordance with the present invention will be explained in detail with reference to the drawings. In these embodiments, a phenomenon known as multiphoton absorption is used for forming a modified region within the object to be processed. Therefore, to begin with, a laser processing method for forming a modified region by the multiphoton absorption will be explained.

A material becomes transparent when its absorption bandgap $E_G$ is greater than photon energy hv. Hence, a condition under which absorption occurs in the material is $hv>E_G$. However, even when optically transparent, the material generates absorption under a condition of $nhv>E_G$ (where n=2, 3, 4, . . . ) if the intensity of laser light becomes very high. This phenomenon is known as multiphoton absorption. In the case of pulsed waves, the intensity of laser light is determined by the peak power density (W/cm$^2$) of laser light at a light-converging point. The multiphoton absorption occurs under a condition where the peak power density is $1\times10^8$ (W/cm$^2$) or greater, for example. The peak power density is determined by (energy of laser light at the light-converging point per pulse)/(beam spot cross-sectional area of laser light ×pulse width). In the case of continuous waves, the intensity of laser light is determined by the field intensity (W/cm$^2$) of laser light at the light-converging point.

Figure 1:
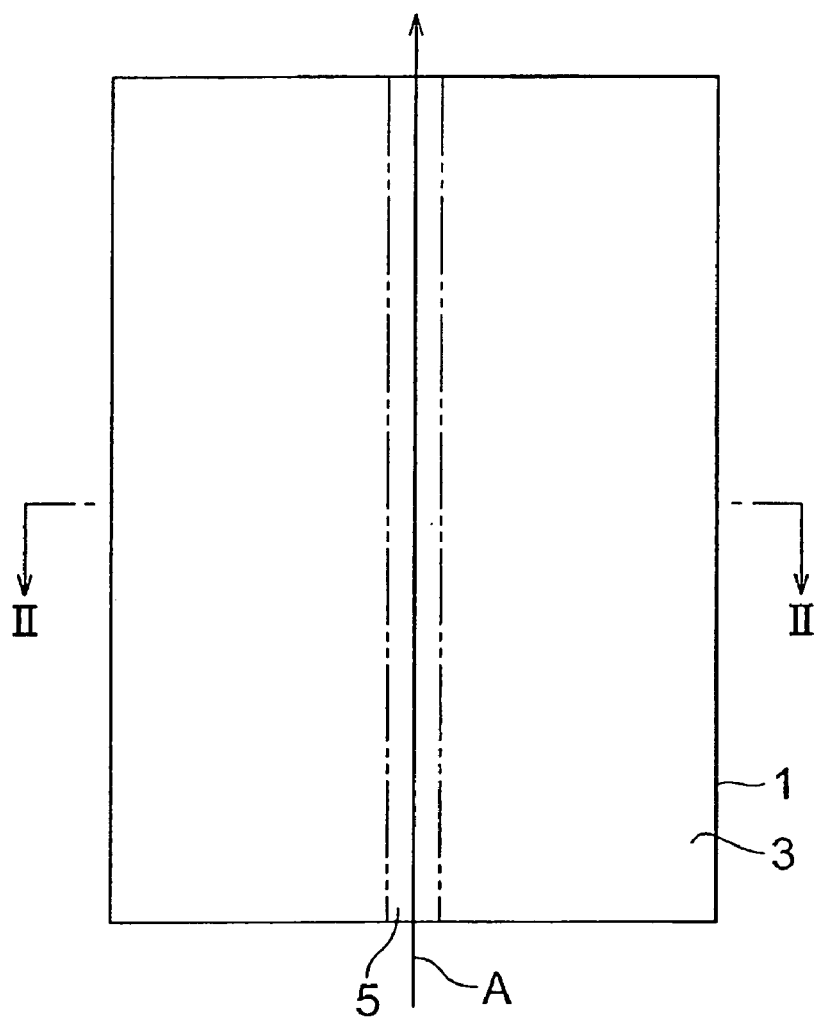
FIG. 1 is a plan view of an object to be processed during laser processing by the laser processing method in accordance with an embodiment.
Figure 2:
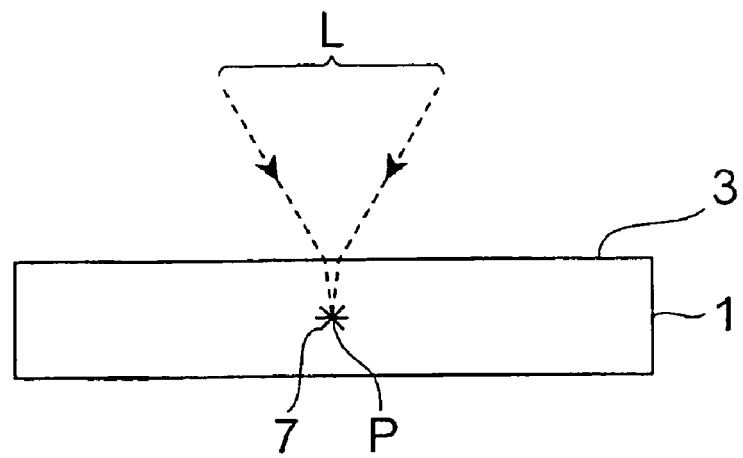
FIG. 2 is a sectional view of the object taken along the line II-II of FIG. 1.

The principle of the laser processing method in accordance with an embodiment using such multiphoton absorption will be explained with reference to FIGS. 1 to 6. As shown in FIG. 1, on a front face 3 of a wafer-like (planar) object to be processed 1, a line to cut 5 for cutting the object 1 exists. The line to cut 5 is a virtual line extending straight. As shown in FIG. 2, the laser processing method in accordance with this embodiment irradiates the object 1 with laser light L while locating a light-converging point P therewithin under a condition generating multiphoton absorption, so as to form a modified region 7. The light-converging point P is a position at which the laser light L is converged. The line to cut 5 may be curved instead of being straight, and may be a line actually drawn on the object 1 without being restricted to the virtual line.

Figure 3:
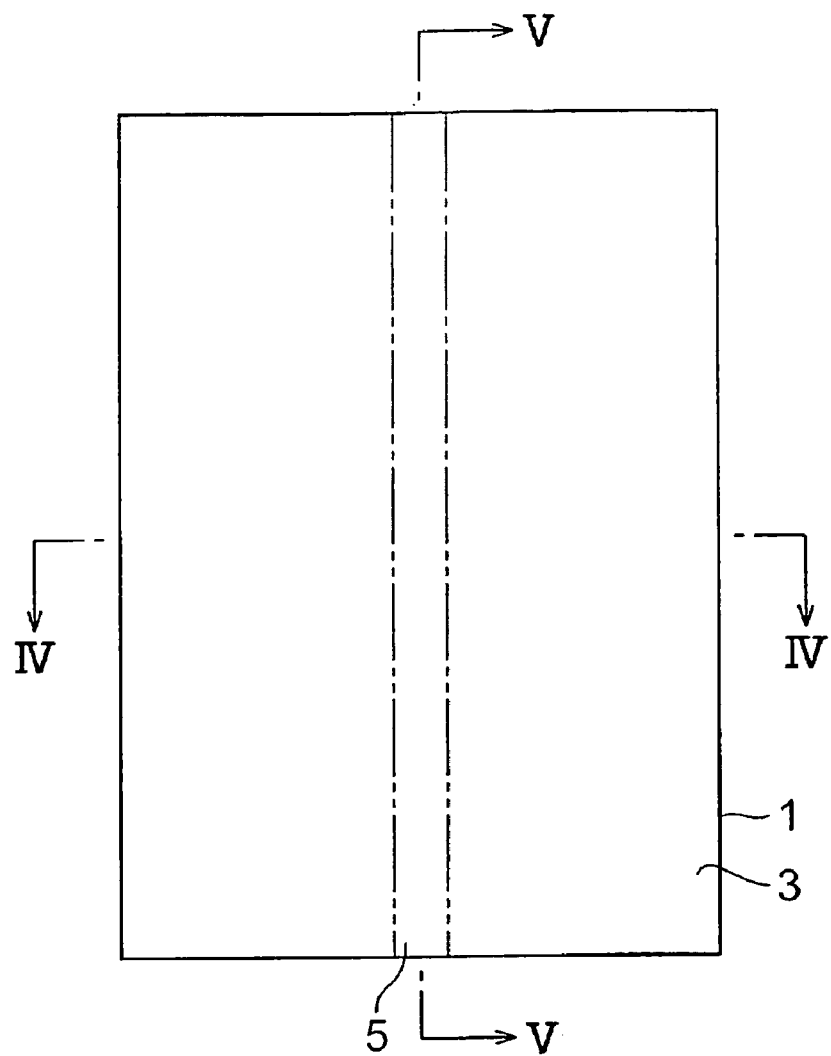
FIG. 3 is a plan view of the object after laser processing by the laser processing method in accordance with the embodiment.
Figure 4:
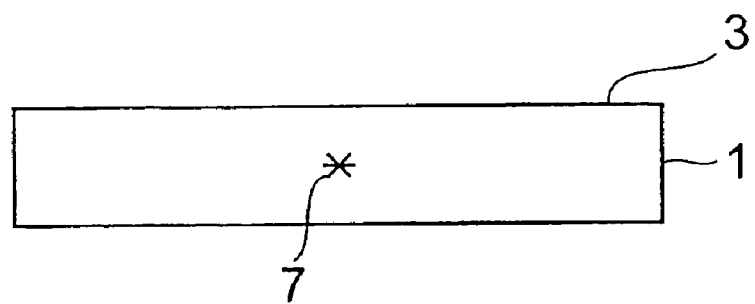
FIG. 4 is a sectional view of the object taken along the line IV-IV of FIG. 3.
Figure 5:
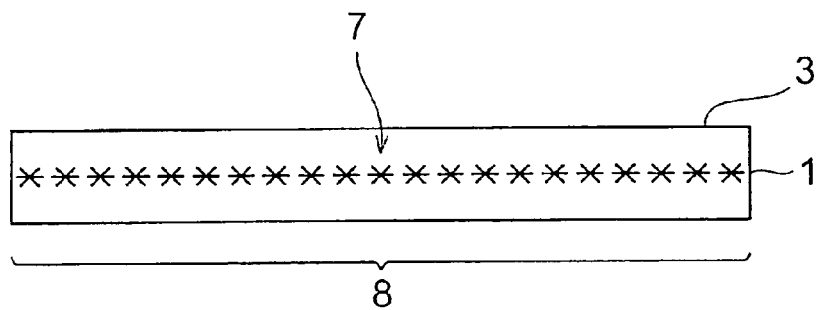
FIG. 5 is a sectional view of the object taken along the line V-V of FIG. 3.

Then, the laser light L is relatively moved along the line to cut 5 (i.e., in the direction of arrow A in FIG. 1), so as to shift the light-converging point P along the line to cut 5. Consequently, as shown in FIGS. 3 to 5, the modified region 7 is formed along the line to cut 5 within the object 1, and becomes a starting point region for cutting 8. The starting point region for cutting 8 refers to a region which becomes a start point for cutting (fracturing) when the object 1 is cut. The starting point region for cutting 8 may be made by forming the modified region 7 either continuously or intermittently.

In the laser processing method in accordance with this embodiment, the modified region 7 is not formed by the heat generated from the object 1 absorbing the laser light L. The laser light L is transmitted through the object 1, so as to generate multiphoton absorption therewithin, thereby forming the modified region 7. Therefore, the front face 3 of the object 1 hardly absorbs the laser light L and does not melt.

Figure 6:
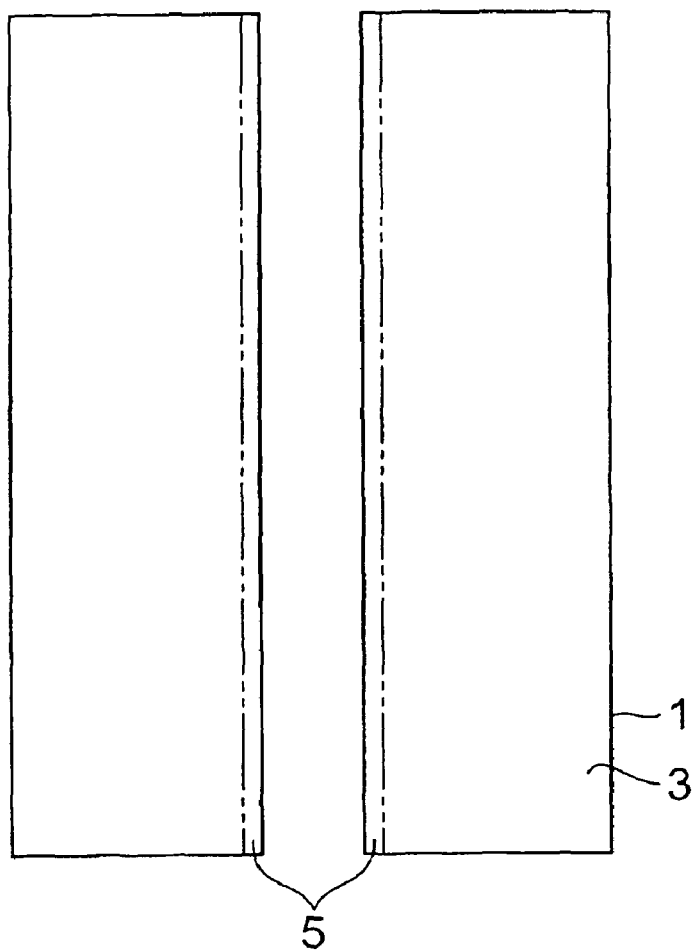
FIG. 6 is a plan view of the object cut by the laser processing method in accordance with the embodiment.

Forming the starting point region for cutting 8 within the object 1 makes it easier to generate fractures from the starting point region for cutting 8 acting as a start point, whereby the object 1 can be cut with a relatively small force as shown in FIG. 6. Therefore, the object 1 can be cut with a high precision without generating unnecessary fractures on the front face 3 of the object 1.

There seem to be the following two ways of cutting the object 1 from the starting point region for cutting 8 acting as a start point. The first case is where an artificial force is applied to the object 1 after the starting point region for cutting 8 is formed, so that the object 1 fractures from the starting point region for cutting 8 acting as a start point, whereby the object 1 is cut. This is the cutting in the case where the object 1 has a large thickness, for example. Applying an artificial force refers to exerting a bending stress or shear stress to the object 1 along the starting point region for cutting 8, or generating a thermal stress by applying a temperature difference to the object 1, for example. The other case is where the forming of the starting point region for cutting 8 causes the object 1 to fracture naturally in its cross-sectional direction (thickness direction) from the starting point region for cutting 8 acting as a start point, thereby cutting the object 1. This becomes possible if the starting point region for cutting 8 is formed by one row of the modified region 7 when the object 1 has a small thickness, or if the starting point region for cutting 8 is formed by a plurality of rows of the modified region 7 in the thickness direction when the object 1 has a large thickness. Even in this naturally fracturing case, fractures do not extend onto the front face 3 at a portion corresponding to an area not formed with the starting point region for cutting 8 in the part to cut, so that only the portion corresponding to the area formed with the starting point region for cutting 8 can be cleaved, whereby cleavage can be controlled well. Such a cleaving method with a favorable controllability is quite effective, since the object 1 to be processed such as silicon wafer has recently been apt to decrease its thickness.

The modified region formed by multiphoton absorption in the laser processing method in accordance with this embodiment encompasses the following cases (1) to (3):

(1) Case Where the Modified Region is a Crack Region Including One Crack or a Plurality of Cracks An object to be processed (e.g., glass or a piezoelectric material made of $LiTaO_3$) is irradiated with laser light while locating a light-converging point therewithin under a condition with a field intensity of at least $1 \times 10^8$ (W/cm$^2$) at the light-converging point and a pulse width of 1 μs or less. This magnitude of pulse width is a condition under which a crack region can be formed only within the object while generating multiphoton absorption without causing unnecessary damages on the front face of the object. This generates a phenomenon of optical damage by multiphoton absorption within the object. This optical damage induces a thermal distortion within the object, thereby forming a crack region therewithin. The upper limit of field intensity is $1 \times 10^{12}$ (W/cm$^2$), for example. The pulse width is preferably 1 ns to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex (registered trademark) glass (with a thickness of 700 μm)

(B) Laser light source: semiconductor laser pumping Nd:YAG laser wavelength: 1064 nm laser light spot cross-sectional area: $3.14 \times 10^{-8}$ cm$^2$ oscillation mode: Q-switched pulse repetition frequency: 100 kHz pulse width: 30 ns output: output<1 mJ/pulse laser light quality: $TEM_{00}$ polarizing property: linear polarization (C) Condenser lens transmittance at a laser light wavelength: 60%

(D) Moving rate of the mount table mounting the object: 100 mm/sec

The laser light quality of $TEM_{00}$ means that the light-converging characteristic is so high that convergence to about the wavelength of laser light is possible.

Figure 7:
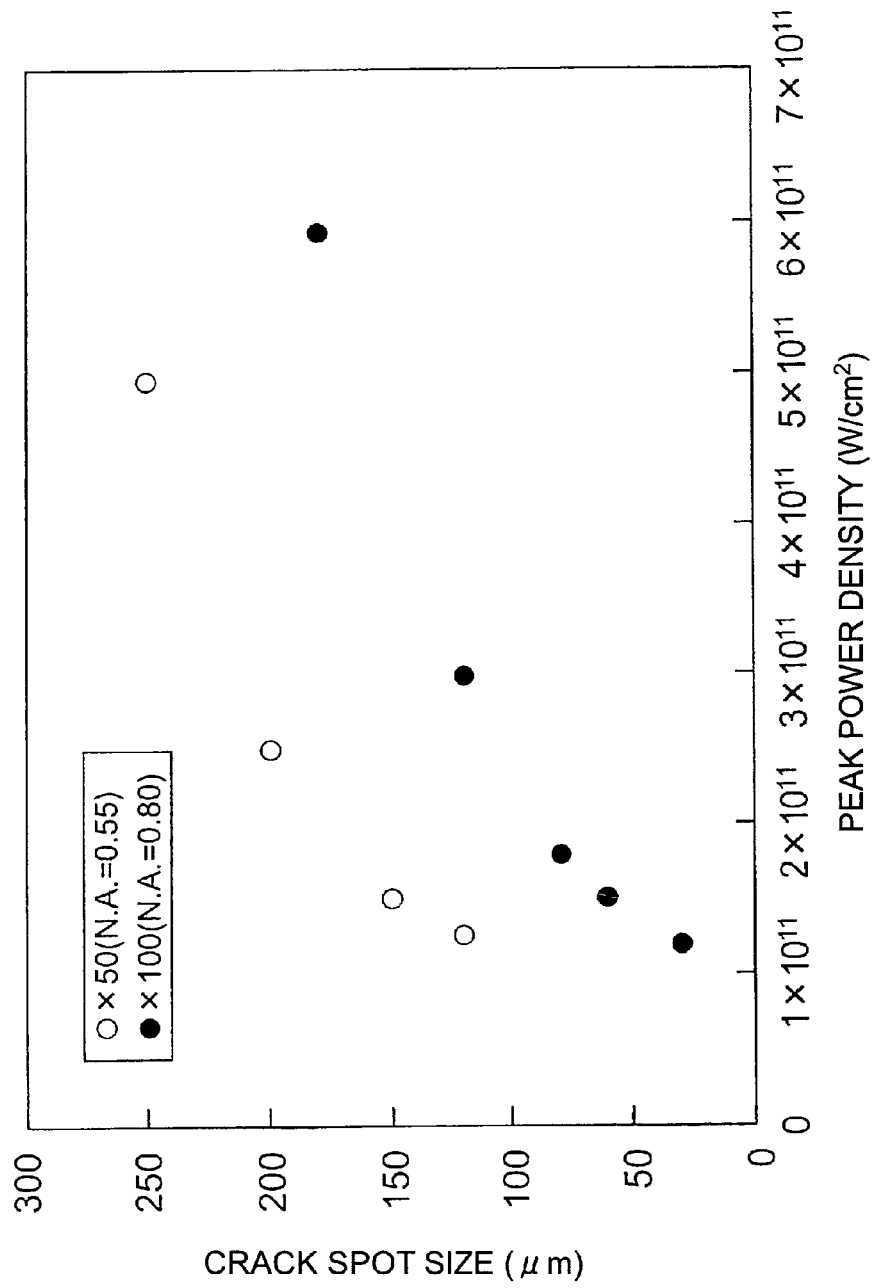
FIG. 7 is a graph showing relationships between the field intensity and crack spot size in the laser processing method in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack spot size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
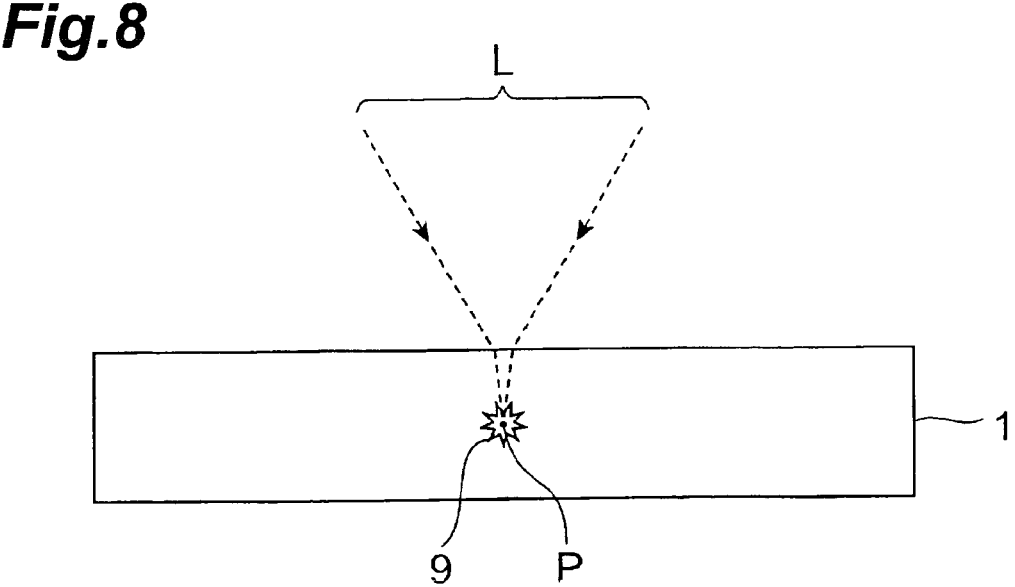
FIG. 8 is a sectional view of the object in a first step of the laser processing method in accordance with the embodiment.
Figure 9:
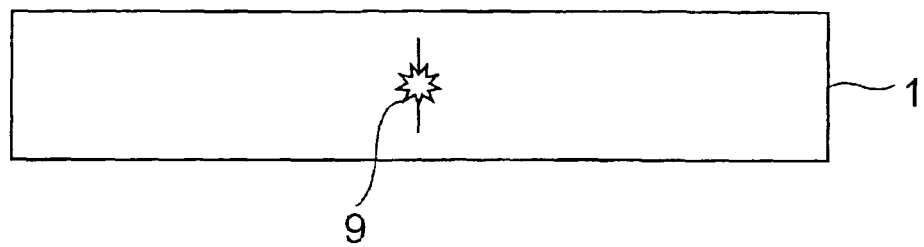
FIG. 9 is a sectional view of the object in a second step of the laser processing method in accordance with the embodiment.
Figure 10:
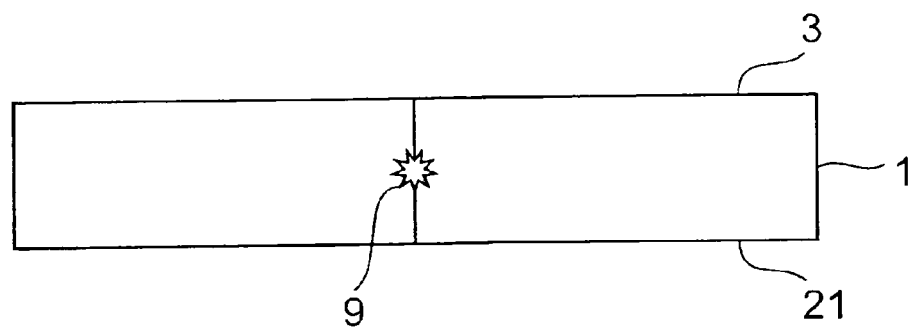
FIG. 10 is a sectional view of the object in a third step of the laser processing method in accordance with the embodiment.
Figure 11:
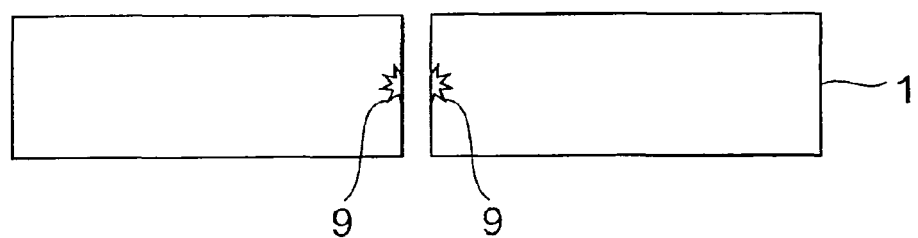
FIG. 11 is a sectional view of the object in a fourth step of the laser processing method in accordance with the embodiment.

A mechanism by which the object to be processed is cut by forming a crack region will now be explained with reference to FIGS. 8 to 11. As shown in FIG. 8, the object 1 is irradiated with laser light L while the light-converging point P is located within the object 1 under a condition where multiphoton absorption occurs, so as to form a crack region 9 therewithin along a line to cut. The crack region 9 is a region containing one crack or a plurality of cracks. Thus formed crack region 9 becomes a starting point region for cutting. As shown in FIG. 9, a crack further grows from the crack region 9 acting as a start point (i.e., from the starting point region for cutting acting as a start point), and reaches the front face 3 and rear face 21 of the object 1 as shown in FIG. 10, whereby the object 1 fractures and is consequently cut as shown in FIG.

11. The crack reaching the front face 3 and rear face 21 of the object 1 may grow naturally or as a force is applied to the object 1.

(2) Case Where the Modified Region is a Molten Processed Region

An object to be processed (e.g., semiconductor material such as silicon) is irradiated with laser light while locating a light-converging point within the object under a condition with a field intensity of at least $1\times10^8$ (W/cm$^2$) at the light-converging point and a pulse width of 1 µs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1\times10^{12}$ (W/cm$^2$), for example. The pulse width is preferably 1 ns to 200 ns, for example.

By an experiment, the inventors verified that a molten processed region was formed within a silicon wafer. The following are conditions of the experiment.

(A) Object to be processed: silicon wafer (with a thickness of 350 µm and an outer diameter of 4 inches)

(B) Laser light source: semiconductor laser pumping Nd:YAG laser wavelength: 1064 nm laser light spot cross-sectional area: $3.14\times10^{-8}$ cm$^2$ oscillation mode: Q-switched pulse repetition frequency: 100 kHz pulse width: 30 ns output: 20 µJ/pulse laser light quality: TEM$_{00}$ polarizing property: linear polarization (C) Condenser lens magnification: ×50

N.A.: 0.55 transmittance at a laser light wavelength: 60%

(D) Moving rate of the mounting table mounting the object: 100 mm/sec

Figure 12:
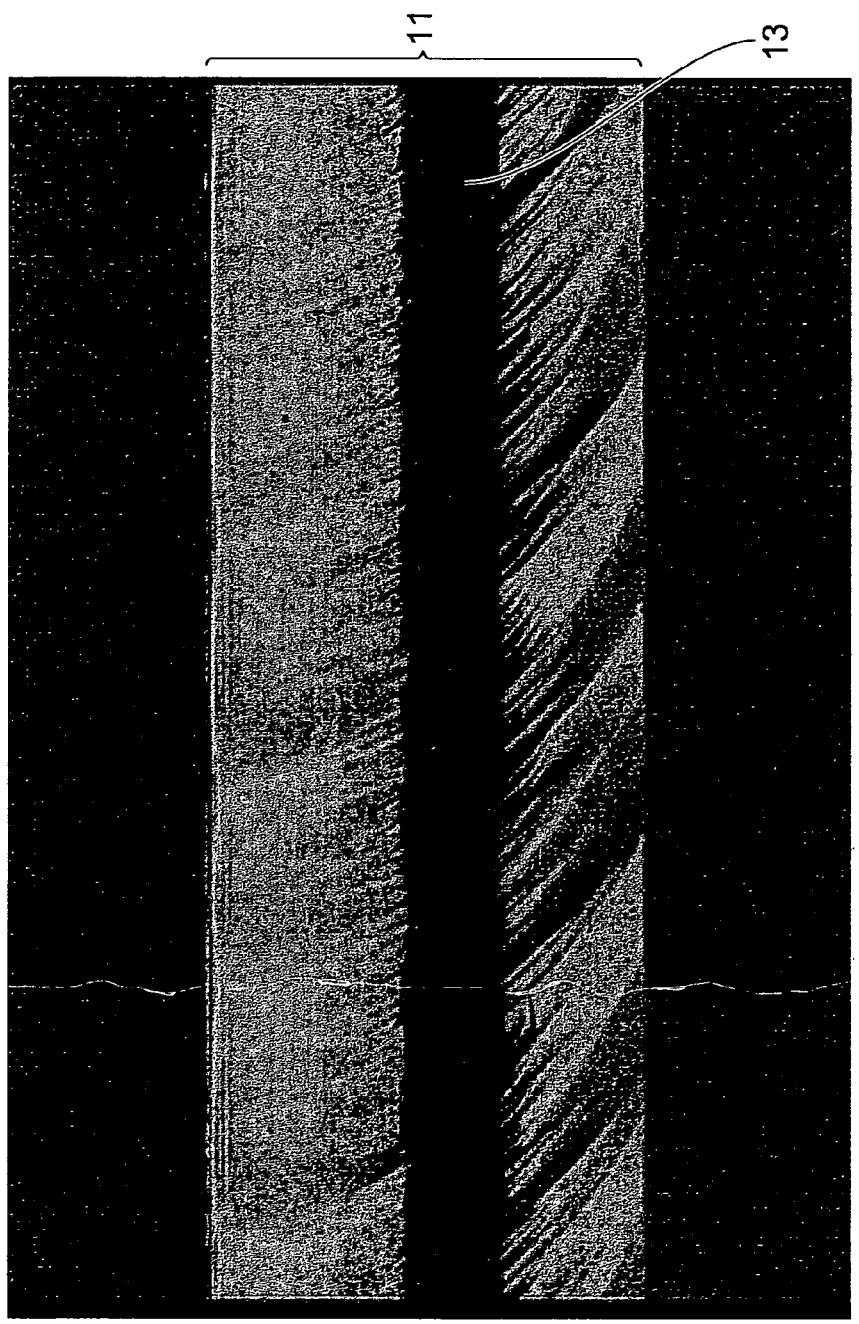
FIG. 12 is a view showing a photograph of a cross section in a part of a silicon wafer cut by the laser processing method in accordance with the embodiment.

FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 µm in the thickness direction.

Figure 13:
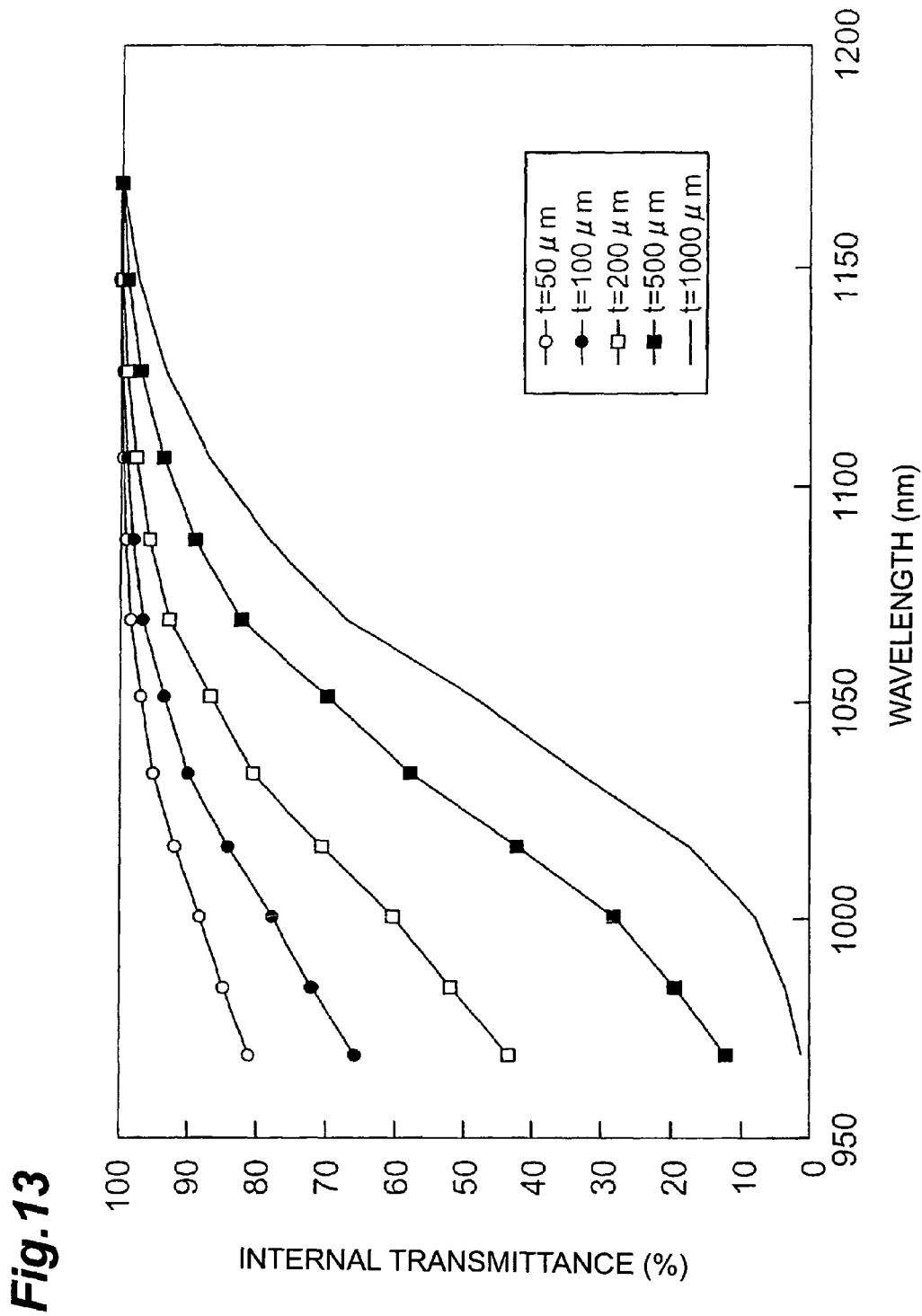
FIG. 13 is a graph showing relationships between laser light wavelength and transmittance within a silicon wafer in the laser processing method in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 µm, 100 µm, 200 µm, 500 µm, and 1000 µm.

For example, at the Nd:YAG laser wavelength of 1064 nm, the laser light appears to be transmitted through the silicon substrate by at least 80% when the silicon substrate has a thickness of 500 µm or less. Since the silicon wafer 11 shown in FIG. 12 has a thickness of 350 µm, the molten processed region 13 caused by multiphoton absorption is formed near the center of the silicon wafer 11, i.e., at a part distanced from the front face by 175 µm. The transmittance in this case is 90% or more with reference to a silicon wafer having a thickness of 200 µm, whereby the laser light is absorbed only slightly within the silicon wafer 11 but is substantially transmitted therethrough. This means that the molten processed region 13 is formed within the silicon wafer 11 not by laser light absorption within the silicon wafer 11 (i.e., not by usual heating with the laser light) but by multiphoton absorption. The forming of a molten processed region by multiphoton absorption is disclosed, for example, in "Silicon Processing Characteristic Evaluation by Picosecond Pulse Laser", Preprints of the National Meetings of Japan Welding Society, Vol. 66 (April, 2000), pp. 72-73.

A fracture is generated in a silicon wafer from a starting point region for cutting formed by a molten processed region, acting as a start point, toward a cross section, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the starting point region for cutting to the front and rear faces of the silicon wafer encompasses a case where the fracture grows from a state where the molten processed region forming the starting point region for cutting is molten and a case where the fracture grows when the molten processed region forming the starting point region for cutting is re-solidified from the molten state. In either case, the molten processed region is formed only within the silicon wafer, and thus is present only within the cut section after cutting as shown in FIG. 12. When a starting point region for cutting is formed within the object by a molten processed region as such, unnecessary fractures deviating from a starting point region for cutting line are harder to occur at the time of cleaving, whereby cleavage control becomes easier.

(3) Case Where the Modified Region is a Refractive Index Changed Region

An object to be processed (e.g., glass) is irradiated with laser light while locating a light-converging point within the object under a condition with a field intensity of at least $1\times10^8$ (W/cm$^2$) at the light-converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1\times10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November, 1997), pp. 105-111.

While the cases (1) to (3) are explained in the foregoing as a modified region formed by multiphoton absorption, a starting point region for cutting may be formed as follows while taking account of the crystal structure of a wafer-like object to be processed and its cleavage characteristic, whereby the object can be cut with a high precision by a smaller force from the starting point region for cutting acting as a start point.

Namely, in the case of a substrate made of a monocrystal semiconductor having a diamond structure such as silicon, it will be preferred if a starting point region for cutting is formed in a direction extending along a (111) plane (first cleavage plane) or a (110) plane (second cleavage plane. In the case of a substrate made of a III-V family compound semiconductor of sphalerite structure such as GaAs, it will be preferred if a starting point region for cutting is formed in a direction extending along a (110) plane. In the case of a substrate having a crystal structure of hexagonal system such as sapphire ($Al_2O_3$), it will be preferred if a starting point region for cutting is formed in a direction extending along a (1120) plane (A plane) or a (1100) plane (M plane) while using a (0001) plane (C plane) as a principal plane.

When the substrate is formed with an orientation flat in a direction to be formed with the above-mentioned starting point region for cutting (e.g., a direction extending along a (111) plane in a monocrystal silicon substrate) or a direction orthogonal to the direction to be formed therewith, the starting point region for cutting extending in the direction to be formed with the starting point region for cutting can be formed easily and accurately with reference to the orientation flat.

Figure 14:
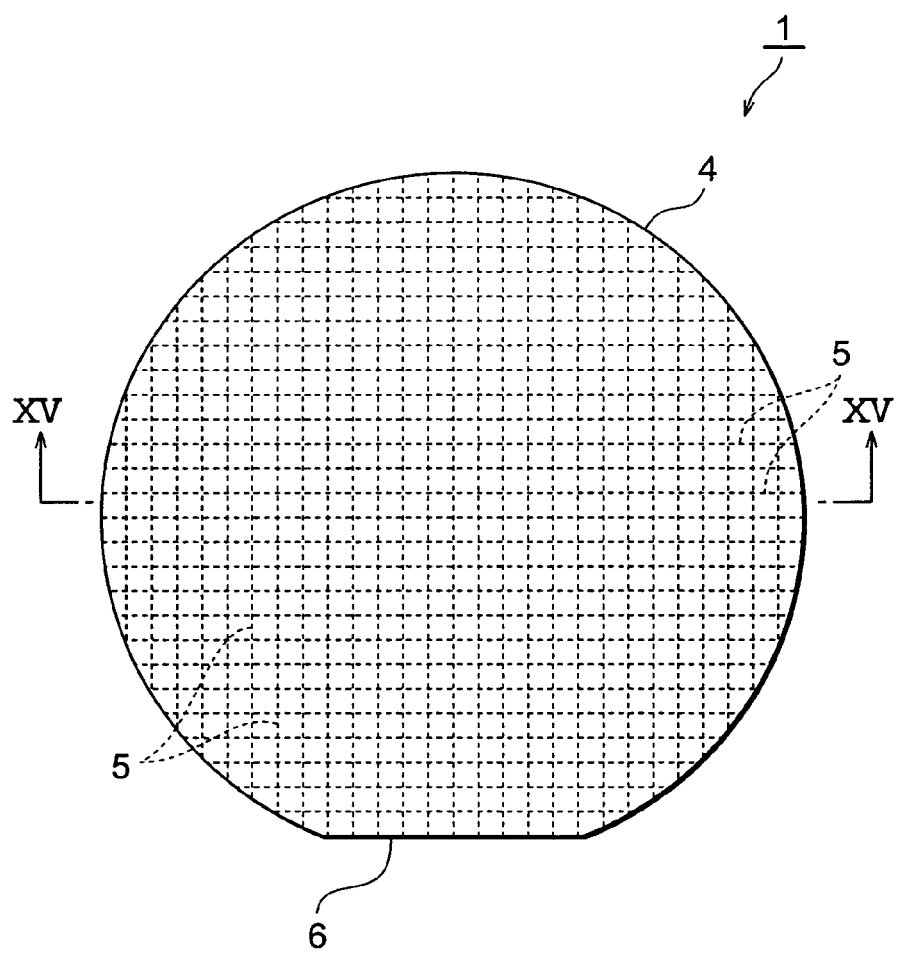
FIG. 14 is a plan view of the object in the laser processing method in accordance with the embodiment.

A preferred embodiment of the present invention will now be explained. FIG. 14 is a plan view of the object to be processed in the laser processing method in accordance with this embodiment, whereas FIG. 15 is a partly sectional view of the object taken along the line XV-XV of FIG. 14.

Figure 15:
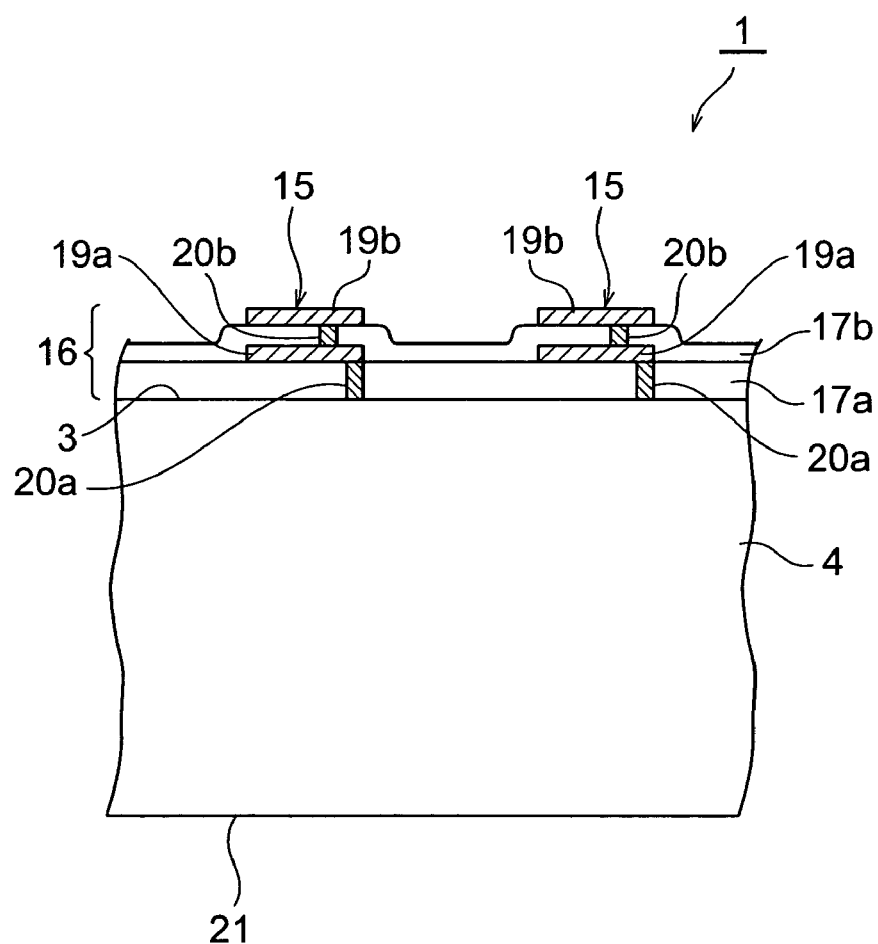
FIG. 15 is a partly sectional view of the object taken along the line XV-XV of FIG. 14.

As shown in FIGS. 14 and 15, an object to be processed 1 comprises a substrate 4 made of silicon having a thickness of 290 μm; and a laminate part 16, formed on the front face 3 of the substrate 4, including a plurality of functional devices 15. Each functional device 15 comprises an interlayer insulating film 17a laminated on the front face 3 of the substrate 4, a wiring layer 19a disposed on the interlayer insulating film 17a, an interlayer insulating film 17b laminated on the interlayer insulating film 17a so as to cover the wiring layer 19a, and a wiring layer 19b disposed on the interlayer insulating film 17b. The wiring layer 19a and the substrate 4 are electrically connected to each other by a conductive plug 20a penetrating through the interlayer insulating film 17a, whereas the wiring layers 19a and 19b are electrically connected to each other by a conductive plug 20b penetrating through the interlayer insulating film 17b.

A number of functional devices 15 are formed like a matrix in directions parallel and perpendicular to an orientation flat 6 of the substrate 4, whereas the interlayer insulating films 17a, 17b are formed between neighboring functional devices 15, 15 so as to cover the front face 3 of the substrate 4 as a whole.

Figure 16:
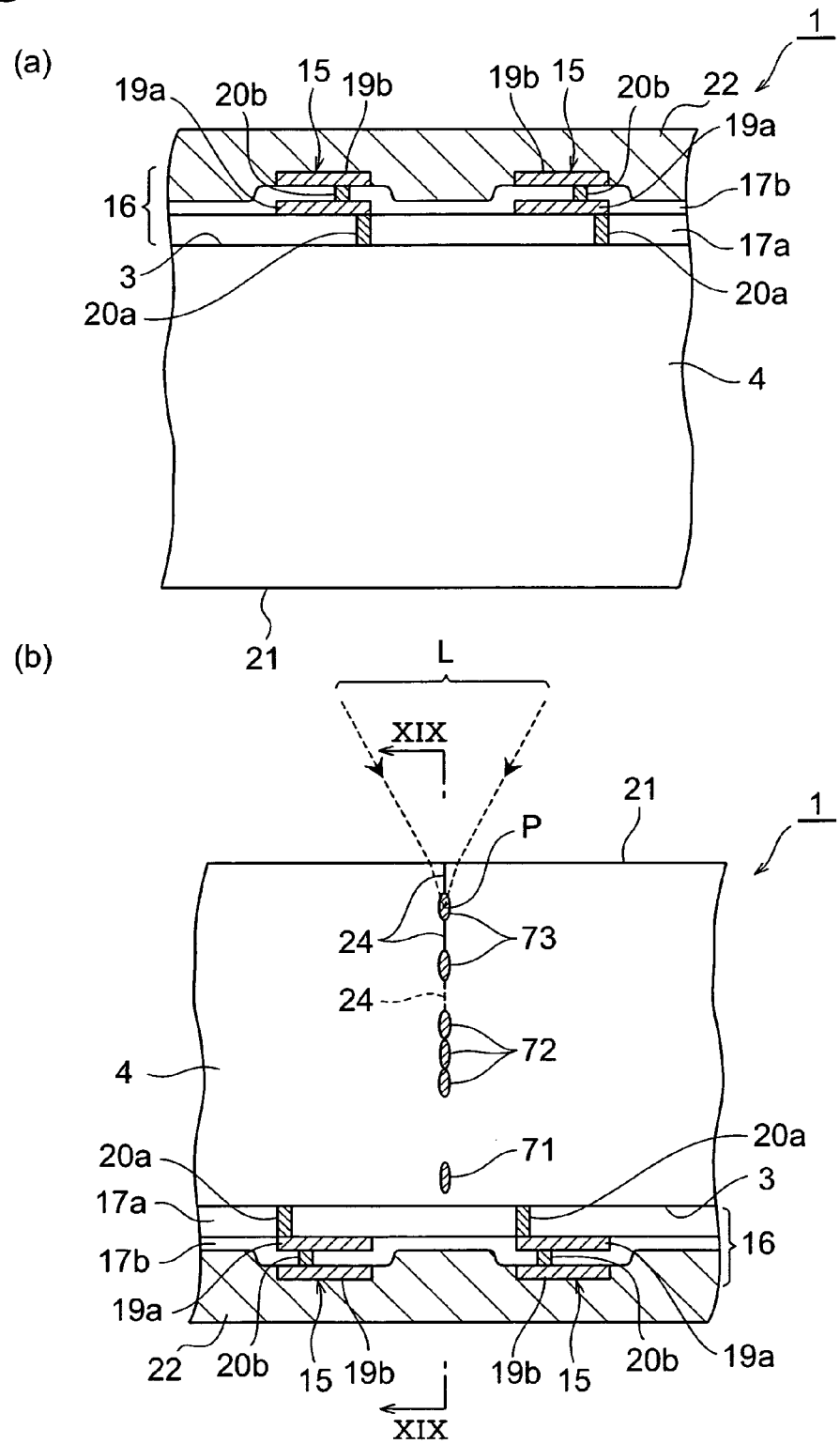
FIG. 16 is a view for explaining the laser processing method in accordance with the embodiment, in which (a) shows a state where a protective tape is bonded to the object, whereas (b) shows a state where the object is irradiated with laser light.

Thus configured object 1 is cut into the functional devices 15 as follows. First, as shown in FIG. 16(a), a protective tape 22 is bonded to the object 1 so as to cover the laminate part 16. Subsequently, as shown in FIG. 16(b), the object 1 is fixed onto a mount table (not depicted) of a laser processing apparatus such that the rear face 21 of the substrate 4 faces up. Here, the protective tape 22 prevents the laminate part 16 from coming into direct contact with the mount table, whereby each functional device 15 can be protected.

Then, lines to cut 5 are set like grids (see broken lines in FIG. 14) so as to pass between neighboring functional devices 15, 15, and the substrate 4 is irradiated with laser light L under a condition generating multiphoton absorption, while using the rear face 21 as a laser light entrance surface, locating a light-converging point P within the substrate 4, and moving the mount table so as to scan the light-converging point P along the lines to cut 5.

The scanning of the light-converging point P along the lines to cut 5 is carried out six times per line to cut 5 while locating the light-converging point P at respective positions with different distances from the rear face 21, whereby one row of a quality modified region (first modified region) 71, three rows of segmented modified regions (second modified regions) 72, and two rows of HC (half cut) modified regions (second modified regions) 73 are formed within the substrate 4 along each line to cut 5 one by one successively from the front face 3 side (whereas conditions under which the modified regions 71, 72, 73 are formed and the like will be explained later). Since the substrate 4 is a semiconductor substrate made of silicon, the modified regions 71, 72, 73 are molten processed regions.

When the modified regions 71, 72, 73 are successively formed one by one from the side farther from the rear face 21 of the substrate 4, no modified region exists between the rear face 21 acting as the laser light entrance surface and the light-converging point P of laser light L at the time of forming each modified region, so that scattering, absorption, and the like of laser light L are not caused by modified regions which have already been formed. Therefore, the modified regions 71, 72, 73 can be formed with a high precision within the substrate 4 along the lines to cut 5. Also, since the rear face 21 of the substrate 4 is used as the laser light entrance surface, the modified regions 71, 72, 73 can be formed reliably within the substrate 4 along the lines to cut 5 even when a member (e.g., TEG) reflecting the laser light L exists on the lines to cut 5 of the laminate part 16.

When forming the quality modified region 71, one row of the quality modified region 71 is formed at a position where the distance between the front face 3 of the substrate 4 and the end part 71a on the front face side of the quality modified region 71 is 5 μm to 15 μm or at a position where the distance between the front face 3 of the substrate 4 and the end part 71b on the rear face side of the quality modified region 71 is [(the thickness of substrate 4)×0.1] μm to [20+(the thickness of substrate 4)×0.1] μm. When forming the segmented modified regions 72, three rows of segmented modified regions 72 are formed in series in the thickness direction of the substrate 4. Further, when forming the HC modified regions 73, two rows of HC modified regions 73 are formed as shown in FIG. 16(b), so as to generate fractures 24 from the HC modified regions 73 to the rear face 21 of the substrate 4. Depending on forming conditions, a fracture 24 may also occur between the neighboring segmented modified region 72 and HC modified region 73.

Figure 17:
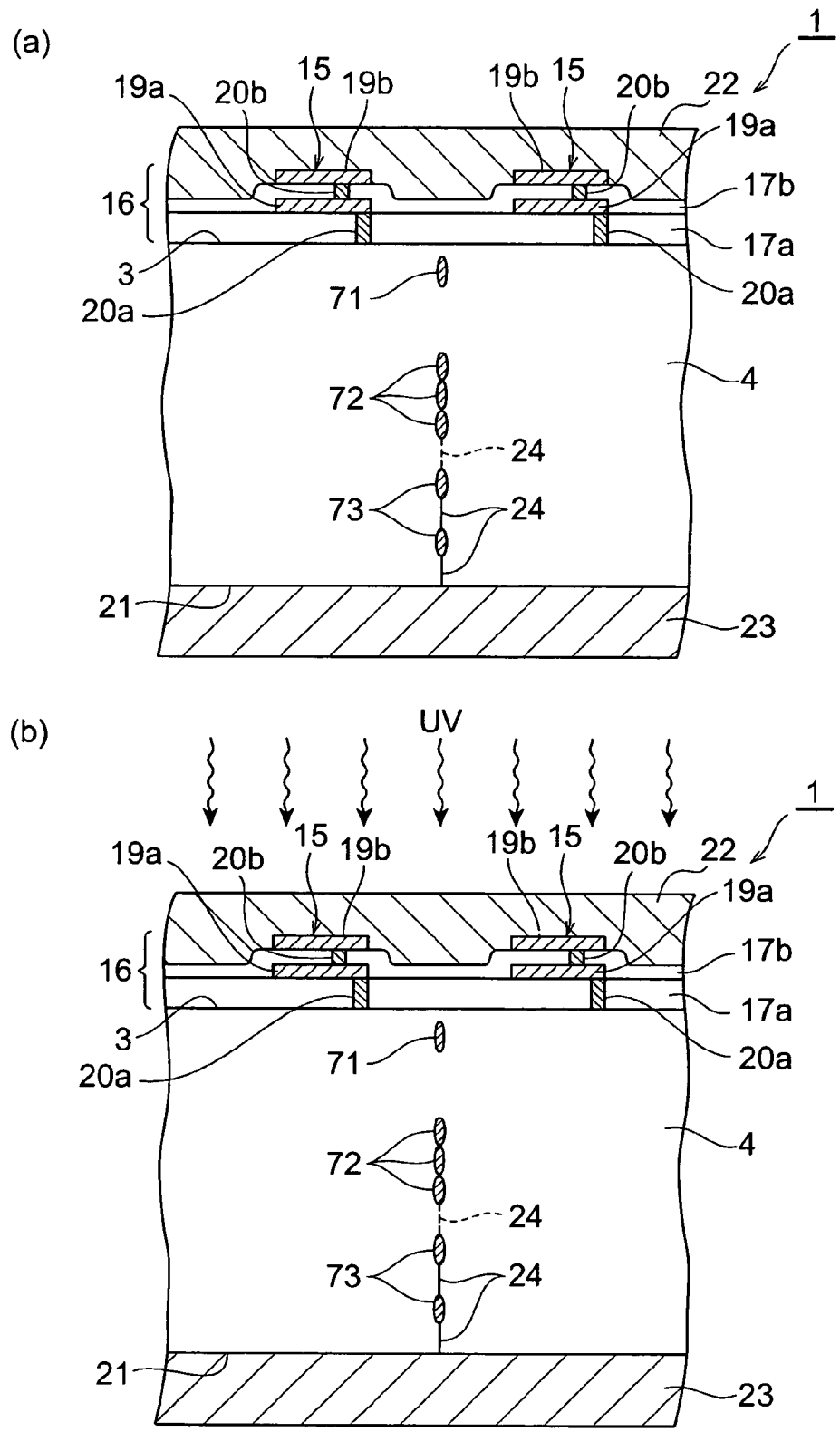
FIG. 17 is a view for explaining the laser processing method in accordance with the embodiment, in which (a) shows a state where an expandable tape is bonded to the object, whereas (b) shows a state where the protective tape is irradiated with UV rays.

After forming the modified regions 71, 72, 73, an expandable tape 23 is bonded to the rear face 21 of the substrate 4 of the object 1 as shown in FIG. 17(a). Subsequently, the protective tape 22 is irradiated with UV rays as shown in FIG. 17(b), so as to lower its adhesive force, whereby the protective tape 22 is peeled off from the laminate part 16 of the object 1 as shown in FIG. 18(a).

Figure 18:
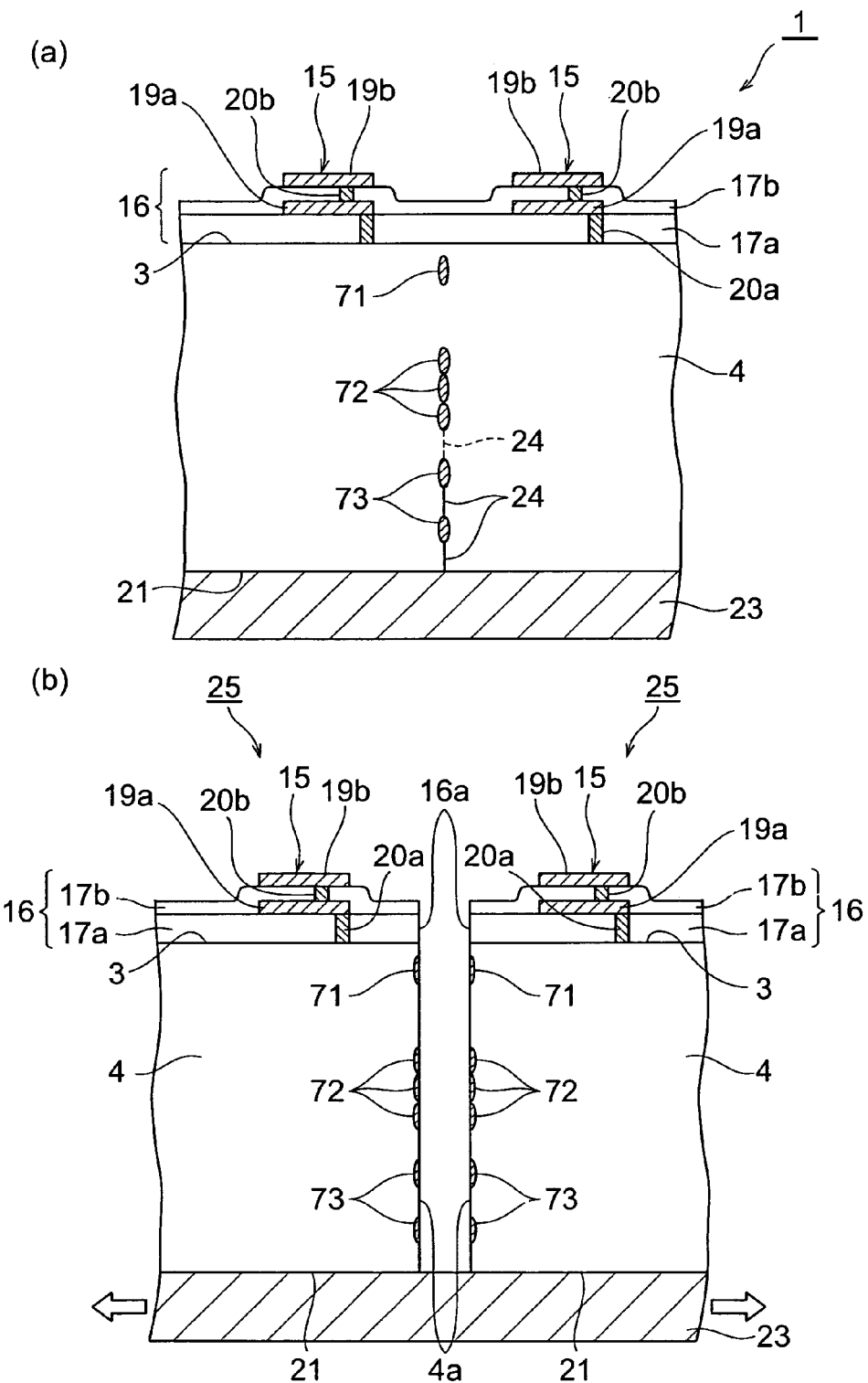
FIG. 18 is a view for explaining the laser processing method in accordance with the embodiment, in which (a) shows a state where the protective tape is peeled off from the object, whereas (b) shows a state where the expandable tape is expanded.

After peeling the protective tape 22 off, the expandable tape 23 is expanded as shown in FIG. 18(b), so as to start fractures from the modified regions 71, 72, 73, thereby cutting the substrate 4 and laminate part 16 along the lines to cut 5, and separating the semiconductor chips 25 obtained by the cutting from each other.

In the above-mentioned laser processing method, as explained in the foregoing, the quality modified region 71, segmented modified regions 72, and HC modified regions 73 to become start points for cutting (fracturing) are formed within the substrate 4 along the lines to cut 5. Therefore, even when the substrate 4 formed with the laminate part 16 including a plurality of functional devices 15 is thick, e.g., with a thickness of 290 µm, the above-mentioned laser processing method can cut the substrate 4 and laminate part 16 with a high precision.

Specifically, in the above-mentioned laser processing method, two rows of HC modified regions 73 are formed at a position between the rear face 21 of the substrate 4 and the segmented modified region 72 closest to the rear face 21, whereby fractures 24 extending along the lines to cut 5 are generated from the HC modified regions 73 to the rear face 21 of the substrate 4. Therefore, when the expandable tape 23 is bonded to the rear face 21 of the substrate 4 and expanded, fractures proceed smoothly from the substrate 4 to the laminate part 16 by way of the three rows of segmented modified regions 72 formed in series in the thickness direction, whereby the substrate 4 and laminate part 16 can be cut along the lines to cut 5 with a high precision.

The segmented modified regions 72 are not limited to three rows as long as they can smoothly advance fractures from the substrate 4 to the laminate part 16. In general, the number of rows of segmented modified regions 72 is decreased/increased as the substrate 4 becomes thinner/thicker. The segmented modified regions 72 may be separated from each other as long as they can smoothly advance fractures from the substrate 4 to the laminate part 16. A single row of HC modified region 73 may be provided alone as long as it can reliably generate a fracture 24 from the HC modified region 73 to the rear face 21 of the substrate 4.

In the above-mentioned laser processing method, the quality modified region 71 is formed at a position where the distance between the front face 3 of the substrate 4 and the end part 71a of the quality modified region 71 on the front face side is 5 µm to 15 µm, or at a position where the front face 3 of the substrate 4 and the end part 71b on the rear face side of the quality modified region 71 is [(the thickness of substrate 4)×0.1] µm to [20+(the thickness of substrate 4)×0.1] µm. When the quality modified region 71 is formed at such a position, the laminate part 16 (constituted by the interlayer insulating films 17a, 17b here) formed on the front face 3 of the substrate 4 can also be cut along the lines to cut 5 with a high precision.

In each of the semiconductor chips 25 cut by using the foregoing laser processing method, the cut section (side face) 4a of the substrate 4 formed with the modified regions 71, 72, 73 and the cut section (side face) 16a of the laminate part 16 become highly accurate cut sections whose irregularities are suppressed as shown in FIG. 18(b).

Figure 20:
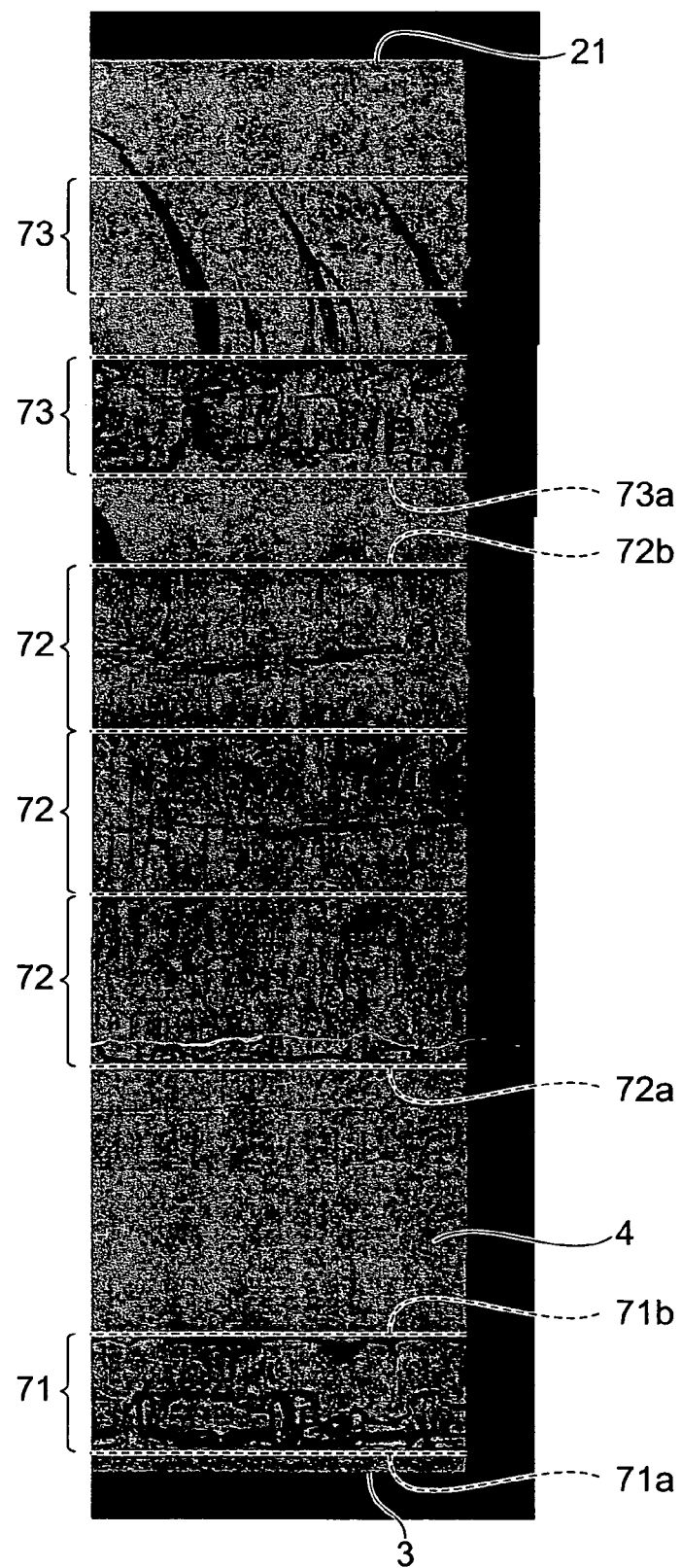
FIG. 20 is a view showing a photograph of a cut section of a substrate cut by using the laser processing method in accordance with the embodiment.

FIG. 20 is a photograph showing the cut section 4a of the substrate 4 cut by using the above-mentioned laser processing method. As mentioned above, the substrate 4 is made of silicon and has a thickness of 300 µm. Forming conditions of the modified regions 71, 72, 73 are listed in the following Table 1. In Table 1, the light-converging position refers to the distance from the rear face 21 to a position where the light-converging point P of laser light L is located, whereas the energy refers to the energy of laser light L at the time of forming the modified regions 71, 72, 73. The pulse width at the time of forming the modified regions 71, 72, 73 is 180 ns, whereas the interval (which will hereinafter be referred to as laser light irradiation position interval) between positions where respective pulses of laser light L are located when irradiating the laser light L along the lines to cut 5 (positions locating the light-converging point P) is 4 µm.

TABLE 1

| | LIGHT-CONVERGING POSITION (µm) | ENERGY (µJ) |
|---|---|---|
| QUALITY MODIFIED REGION 71 | 267 | 15 |
| SEGMENTED MODIFIED REGION 72 (FRONT FACE 3 SIDE) | 196 | 20 |
| SEGMENTED MODIFIED REGION 72 | 160 | 20 |
| SEGMENTED MODIFIED REGION 72 (REAR FACE 21 SIDE) | 125 | 20 |
| HC MODIFIED REGION 73 (FRONT FACE 3 SIDE) | 71 | 10 |
| HC MODIFIED REGION 73 (REAR FACE 21 SIDE) | 39 | 10 |

Here, in the thickness direction of the substrate 4, the quality modified region 71 had a width of about 20 µm, each segmented modified region 72 had a width of about 37 µm, and each HC modified region 73 had a width of about 20 µm. The distance between the front face 3 and the end part 71a of the quality modified region 71 on the front face side was about 7 µm, the distance between the end part 71b of the quality modified region 71 on the rear face side and the end part 72a of the segmented modified region 72 on the front face side opposing each other was about 59 µm, and the distance between the end part 72b of the segmented modified region 72 on the rear face side and the end part 73a of the HC modified region 73 on the front face side was about 24 µm. The segmented modified regions 72 were formed in series in the thickness direction of the substrate 4.

Figure 19:
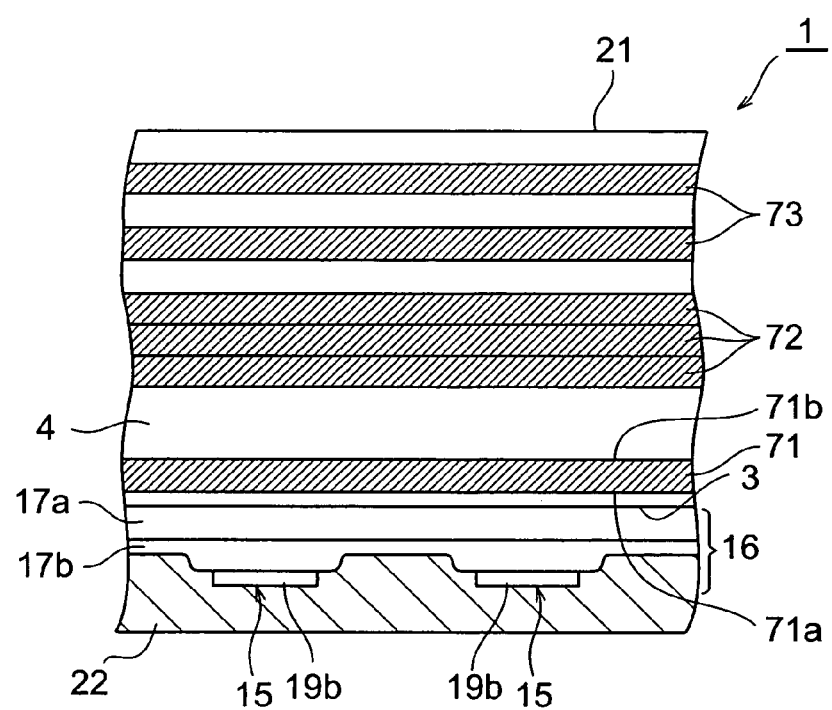
FIG. 19 is a partly sectional view of the object taken along the line XIX-XIX of FIG. 16(b)

The width of the quality modified region 71 refers to the distance between the end part 71a of the quality modified region 71 on the front face side and the end part 71b thereof on the rear face side (see FIG. 19). The end part 71a of the quality modified region 71 on the front face side refers to an "average position in the thickness direction of the substrate 4" of the end part on the front face 3 side of the quality modified region 71 formed along the lines to cut 5, whereas the end part 71b of the quality modified region 71 on the rear face side refers to an "average position in the thickness direction of the substrate 4" of the end part on the rear face 21 side of the quality modified region 71 formed along the lines to cut 5. The same holds in the segmented modified regions 72 and HC modified regions 73.

Forming conditions and the like of the above-mentioned modified regions 71, 72, 73 will now be explained. The following forming conditions and the like are effective when the substrate 4 has a thickness of 150 µm to 800 µm in particular.

(1) Energy of Laser Light L When Forming the HC Modified Region 73

As can be seen from data of the following Table 2, the energy of laser light L at the time of forming the HC modified region 73 is preferably 1 µJ to 20 µJ. More specifically, the energy is preferably 1 µJ to 10 µJ when the transmittance of laser light in the substrate 4 is 30% or higher, and 2 µJ to 20 µJ when the transmittance is 15% or less. The transmittance decreases remarkably when the substrate 4 is thick and includes a large content of impurities.

Figure 21:
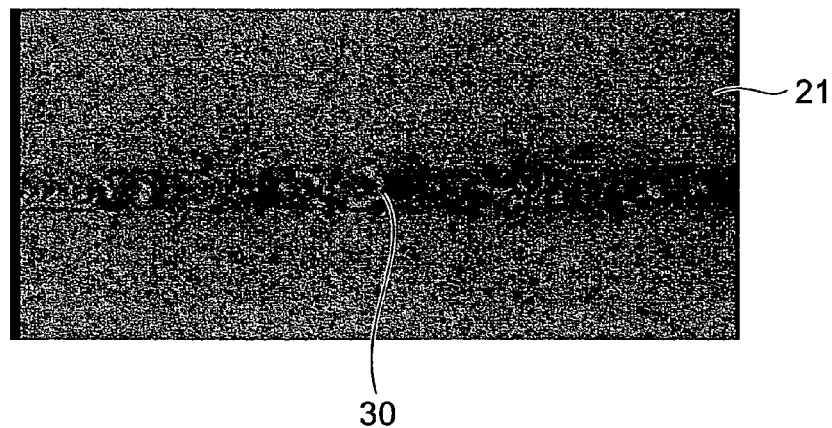
FIG. 21 is a view showing a photograph of the rear face of the substrate in the case where the light-converging point of laser light is located at a position distanced by 40 µm from the rear face while the laser light energy is 20 µJ when forming an HC modified region.

When the HC modified region 73 is formed under such a condition, fractures 24 starting from the HC modified region 73 tend to reach the rear face 21 of the substrate 4 reliably. When the energy of laser light L is less than 1 µJ, fractures 24 starting from the HC modified region 73 are harder to reach the rear face 21 of the substrate 4. When the energy of laser light L exceeds 20 µJ, on the other hand, damages 30 such as melting are likely to occur in the rear face 21 of the substrate 4 as shown in FIG. 21. FIG. 21 is a view showing a photograph of the rear face 21 of the substrate 4 in the case where the light-converging point P of laser light L is located at a position distanced by 40 μm from the rear face 21 while the energy of laser light L is 25 μJ when forming the HC modified region 73.

TABLE 2

| | ENERGY (μJ) | | | | | | | | |
|---|---|---|---|---|---|---|---|---|---|
| | 0.5 | 1.0 | 2.0 | 2.5 | 5.0 | 10 | 15 | 20 | 25 |
| TRANSMITTANCE ≧30% | Δ | ○ | ○ | ○ | ○ | ○ | X | X | X |
| TRANSMITTANCE ≦15% | X | Δ | ○ | ○ | ○ | ○ | ○ | ○ | X |

"Δ" on the lower energy side: respective parts where fractures 24 reach the rear face 21 of the substrate 4 and not coexist
"X" on the lower energy side: fractures 24 hardly reach the rear face 21 of the substrate 4
"X" on the higher energy side: damages such as melting occur in the rear face 21 of the substrate 4

The data of Table 2 are those obtained in the case where at least one row of HC modified region 73 was formed within the range of 20 μm to 110 μm from the rear face 21 of the substrate 4.

(2) Energy of Laser Light L When Forming the Segmented Modified Regions 72

As can be seen from data of the following Table. 3, the energy of laser light at the time of forming the segmented modified regions 72 is preferably 1.6 to 3.0 when the energy of laser light L at the time of forming the HC modified region 73 is taken as 1. More specifically, the energy is preferably 1.6 to 3.0 when the transmittance of laser light L in the substrate 4 is 30% or higher, and 2.3 to 3.0 when the transmittance of laser light L in the substrate 4 is 15% or less.

When the segmented modified regions 72 are formed under such a condition, fractures starting from the segmented modified regions 72 tend to occur along the lines to cut with a high accuracy when cutting the substrate 4 and laminate part 16. When the energy of laser light L is less than 1.6, fractures starting from the segmented modified regions 72 are harder to occur at the time of cutting the substrate 4 and laminate part 16. When the energy of laser light L exceeds 3.0, on the other hand, fractures starting from the segmented modified regions 72 are likely to deviate from the lines to cut 5 at the time of cutting the substrate 4 and laminate part 16.

TABLE 3

| | ENERGY RATIO | | | | | | | |
|---|---|---|---|---|---|---|---|---|
| | 1.0 | 1.1 | 1.3 | 1.4 | 1.5 | 1.6 | 1.7 | 1.8 |
| TRANSMITTANCE ≧30% | X | X | X | X | Δ | ○ | ○ | ○ |
| TRANSMITTANCE ≦15% | X | X | X | X | X | X | X | X |

| | ENERGY RATIO | | | | | | | |
|---|---|---|---|---|---|---|---|---|
| | 1.9 | 2.0 | 2.1 | 2.2 | 2.3 | 3.0 | 3.1 | 3.2 |
| TRANSMITTANCE ≧30% | ○ | ○ | ○ | ○ | ○ | ○ | Δ | X |
| TRANSMITTANCE ≦15% | X | X | Δ | Δ | ○ | ○ | Δ | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: favorable and unfavorable cutting quality parts coexist
"X" on the higher energy side: cutting quality is low, e.g., chipping occurs in cut sections As can be seen from data of the following Table 4, the energy of laser light L at the time of forming the segmented modified regions 72 is 2 μJ to 50 μJ. More specifically, the energy is preferably 2 μJ to 20 μJ (more preferably 2 μJ to 15 μJ) when the transmittance of laser light L in the substrate 4 is 30% or higher, and 3 μJ to 50 μJ (more preferably 3 μJ to 45 μJ) when the transmittance is 15% or less. The preferred range of energy of laser light L is broader when the transmittance is 15% or less, since a greater energy is required for forming a modified region as the transmittance is lower.

When the segmented modified regions 72 are formed under such a condition, fractures starting from the segmented modified regions 72 tend to occur along the lines to cut 5 with a high precision at the time of cutting the substrate 4 and laminate part 16. When the energy of laser light L is less than 2 μJ, fractures starting from the segmented modified regions 72 are harder to occur at the time of cutting the substrate 4 and laminate part 16. When the energy of laser light L exceeds 50 μJ, on the other hand, fractures starting from the segmented modified regions 72 are likely to deviate from the lines to cut 5 at the time of cutting the substrate 4 and laminate part 16.

TABLE 4

| | ENERGY (μJ) | | | | | | |
|---|---|---|---|---|---|---|---|
| | 1.0 | 2.0 | 3.0 | 5.0 | 10 | 15 | 20 |
| TRANSMITTANCE ≧30% | X | ○ | ○ | ○ | ○ | ○ | Δ |
| TRANSMITTANCE ≦15% | X | Δ | ○ | ○ | ○ | ○ | ○ |

| | ENERGY (μJ) | | | | | | |
|---|---|---|---|---|---|---|---|
| | 25 | 30 | 35 | 40 | 45 | 50 | 55 |
| TRANSMITTANCE ≧30% | X | X | X | X | X | X | X |
| TRANSMITTANCE ≦15% | ○ | ○ | ○ | ○ | ○ | Δ | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: favorable and unfavorable cutting quality parts coexist
"X" on the higher energy side: cutting quality is low, e.g., chipping occurs in cut sections (3) Energy of Laser Light When Forming the Quality Modified Region 71

As can be seen from data of the following Table 5, in the case where the energy of laser light L at the time of forming the HC modified regions 73 is taken as 1, the energy of laser light L at the time of forming the quality modified region 71 is preferably 1.4 to 1.9 when the transmittance of laser light L in the substrate 4 is 30% or higher, and 2.3 to 3.0 when the transmittance of laser light L in the substrate 4 is 15% or less.

When the quality modified region 71 is formed under such a condition, fractures starting from the quality modified region 71 tend to reach the laminate part 16 along the lines to cut 5 with a high precision at the time of cutting the substrate 4 and laminate part 16. When the energy of laser light L is lower than the above-mentioned condition, fractures starting from the quality modified region 71 tend to reach the laminate part 16 while deviating from the lines to cut 5. When the energy of laser light L exceeds the above-mentioned condition, on the other hand, damages such as melting are likely to occur in the laminate part 16.

TABLE 5

| | ENERGY RATIO | | | | | | | |
|---|---|---|---|---|---|---|---|---|
| | 1.0 | 1.1 | 1.3 | 1.4 | 1.5 | 1.6 | 1.7 | 1.8 |
| TRANSMITTANCE ≧30% | X | X | Δ | ◯ | ◯ | ◯ | ◯ | ◯ |
| TRANSMITTANCE ≦15% | X | X | X | X | X | X | X | X |

| | ENERGY RATIO | | | | | | | |
|---|---|---|---|---|---|---|---|---|
| | 1.9 | 2.0 | 2.1 | 2.2 | 2.3 | 3.0 | 3.1 | 3.2 |
| TRANSMITTANCE ≧30% | ◯ | Δ | X | X | X | X | X | X |
| TRANSMITTANCE ≦15% | X | X | Δ | Δ | ◯ | ◯ | Δ | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: damages such as melting partly occur in the laminate part 16
"X" on the higher energy side: damages such as melting occur in the laminate part 16

As can be seen from data of the following Table 6, the energy of laser light at the time of forming the quality modified region 71 is preferably 2 μJ to 50 μJ. More specifically, the energy is preferably 2 μJ to 20 μJ (more preferably 2 μJ to 15 μJ) when the transmittance of laser light L in the substrate 4 is 30% or higher, and 3 μJ to 50 μJ (more preferably 3 μJ to 45 μJ) when the transmittance is 15% or less.

When the quality modified region 71 is formed under such a condition, fractures starting from the quality modified region 71 tend to reach the laminate part 16 along the lines to cut 5 with a high precision at the time of cutting the substrate 4 and laminate part 16. When the energy of laser light L is lower than 2 μJ, fractures starting from the quality modified region 71 tend to reach the laminate part 16 while deviating from the lines to cut 5 at the time of cutting the substrate 4 and laminate part 16. When the energy of laser light L exceeds 50 μJ, on the other hand, damages such as melting are likely to occur in the laminate part 16.

TABLE 6

| | ENERGY (μJ) | | | | | | |
|---|---|---|---|---|---|---|---|
| | 1.0 | 2.0 | 3.0 | 5.0 | 10 | 15 | 20 |
| TRANSMITTANCE ≧30% | X | ◯ | ◯ | ◯ | ◯ | ◯ | Δ |
| TRANSMITTANCE ≦15% | X | Δ | ◯ | ◯ | ◯ | ◯ | ◯ |

| | ENERGY (μJ) | | | | | | |
|---|---|---|---|---|---|---|---|
| | 25 | 30 | 35 | 40 | 45 | 50 | 55 |
| TRANSMITTANCE ≧30% | X | X | X | X | X | X | X |
| TRANSMITTANCE ≦15% | ◯ | ◯ | ◯ | ◯ | ◯ | Δ | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: damages such as melting partly occur in the laminate part 16
"X" on the higher energy side: damages such as melting occur in the laminate part 16

(4) Forming Position of Segmented Modified Regions 72

The distance between respective positions at which the light-converging point P of laser light is located when forming neighboring segmented modified regions 72 is preferably 24 μm to 70 μm. More specifically, the distance is preferably 30 μm to 70 μm when the transmittance of laser light L in the substrate 4 is 30% or higher, and 24 μm to 50 μm when the transmittance is 15% or less. When the segmented modified regions 72 are formed under such a condition, neighboring modified regions 72 tend to become in series in the thickness direction of the substrate 4, whereby the substrate 4 and laminate part 16 can easily be cut even if the substrate 4 is thick.

Preferably, the position at which the light-converging point P of laser light L is located when forming the segmented modified regions 72 is distanced from the rear face 21 by 50 μm to [(the thickness of substrate 4)×0.9 (preferably 0.7)] μm. When the segmented modified regions 72 are formed under such a condition, the substrate 4 and laminate part 16 can easily be cut even if the substrates is thick.

When forming the segmented modified region 72 and HC modified region 73 neighboring each other, it will be preferred if the position at which the light-converging point P of laser light is located when forming the segmented modified region 72 is within the range of 30 μm to 100 μm on the front face 2 side of the substrate 4 from the position at which the light-converging point P of laser light is located when forming the HC modified region 73. Here, the distance between the end part of the segmented modified region 72 on the rear face side and the end part of the HC modified region 73 on the front face side opposing each other becomes 15 μm to 60 μm (preferably 15 μm to 35 μm), whereby fractures 24 are likely to occur between the neighboring segmented modified region 72 and HC modified region 73 as well.

(5) Forming Position of HC Modified Regions 73

Figure 22:
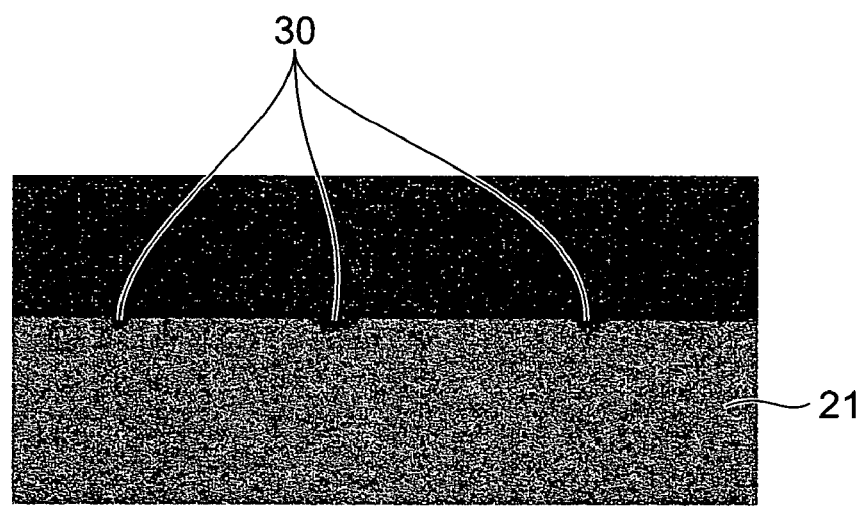
FIG. 22 is a view showing a photograph of the rear face of the substrate in the case where the light-converging point of laser light is located at a position distanced by 15 µm from the rear face while the laser light energy is 10 µJ when forming an HC modified region.

Preferably, the position at which the light-converging point P of laser light L is located when forming the HC modified region 73 is distanced from the rear face 21 by 20 μm to 110 μm. When the HC modified region is formed under such a condition, fractures 24 starting from the HC modified region 73 tend to reach the rear face 21 of the substrate 4 reliably. When the distance from the rear face 21 is less than 20 μm, damages 30 such as melting are likely to occur in the rear face 21 of the substrate 4 as shown in FIG. 22. FIG. 22 is a view showing a photograph of the rear face 21 of the substrate 4 in the case where the position at which the light-converging point P of laser light is located when forming the HC modified region 73 is distanced from the rear face 21 by 15 μm while the energy of laser light L is 10 μJ. When the distance from the rear face 21 exceeds 110 μm, on the other hand, fractures 24 starting from the HC modified region 73 are harder to reach the rear face 21 of the substrate 4. Here, the distance between the rear face 21 of the substrate 4 and the end part of the HC modified region 73 on the rear face side becomes 10 μm to 100 μm.

(6) Distance Between the End Part of the Segmented Modified Region 72 on the Rear Face Side and the End Part of the HC Modified Region 73 on the Front Face Side Opposing Each Other The distance between the end part of the segmented modified region 72 on the rear face side and the end part of the HC modified region 73 on the front face side opposing each other is preferably 15 μm to 60 μm, more preferably 15 μm to 35 μm. When the segmented modified region 72 and HC modified region 73 are formed under such a condition, fractures starting from the modified regions 72, 73 tend to occur along the lines to cut 5 with a high precision, whereby the cut section 4a of the substrate 4 in each semiconductor chip 25 becomes a highly accurate cut section. When the distance is less than 15 μm, fractures starting from the modified regions 72, 73 are likely to deviate from the lines to cut 5 at the time of cutting the substrate 4 and laminate part 16, whereby the cut section 4a of the substrate 4 in the semiconductor chip 25 is harder to become a highly accurate cut section. When the distance exceeds 60 μm, on the other hand, the interaction between the modified region 72 and HC modified region 73 becomes smaller at the time of cutting the substrate 4 and laminate part 16, whereby the cut section 4a of the substrate 4 in the semiconductor chip 25 is harder to become a highly accurate cut section.

(7) Distance Between the End Part of the Quality Modified Region 71 on the Rear Face Side and the End Part of the Segmented Modified Region 72 on the Front Face Side Opposing Each Other The distance between the end part of the quality modified region 71 on the rear face side and the end part of the segmented modified region 72 on the front face side opposing each other is preferably 0 µm to [(the thickness of substrate 4)−(the thickness of substrate 4)×0.6] µm. When the quality modified region 71 and segmented modified region 72 are formed under such a condition, fractures starting from the modified regions 71, 72 tend to occur along the lines to cut 5 with a high precision at the time of cutting the substrate 4 and laminate part 16, whereby the cut section 4a of the substrate 4 and the cut section 16a of the laminate part 16 in each semiconductor chip 25 become highly accurate cut sections. When the distance exceeds [(the thickness of substrate 4)−(the thickness of substrate 4)×0.6] µm, the cut section 4a of the substrate 4 of the semiconductor chip 25 is harder to become a highly accurate cut section between the quality modified region 71 and segmented modified region 72 at the time of cutting the substrate 4 and laminate part 16. The distance is set to 0 µm when completely cutting the substrate 4 by irradiation with the laser light L alone.

(8) Forming Position of the Quality Modified Region 71

Preferably, the quality modified region 71 is formed at a position where the distance between the front face 3 of the substrate 4 and the end part of the quality modified region 71 on the front face side is 5 µm to 15 µm, or at a position where the distance between the front face 3 of the substrate 4 and the end part of the quality modified region 71 on the rear face side is [(the thickness of substrate 4)×0.1] µm to [20+(the thickness of substrate 4)×0.1] µm. When the quality modified region 71 is formed under such a condition, the skirt width S can be suppressed to 3 µm or less as shown in FIG. 23, whereby the laminate part 16 formed on the front face 3 of the substrate 4 can be cut along the lines to cut 5 with a high precision.

Figure 23:
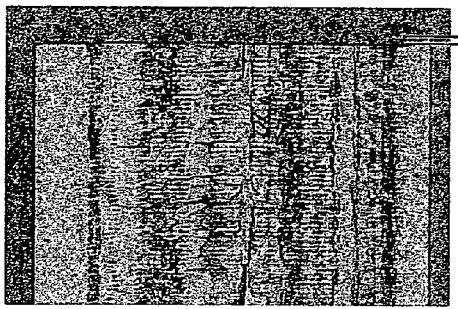
FIG. 23 is a table showing the relationship between quality modified region forming conditions and skirt width.
Figure 23:
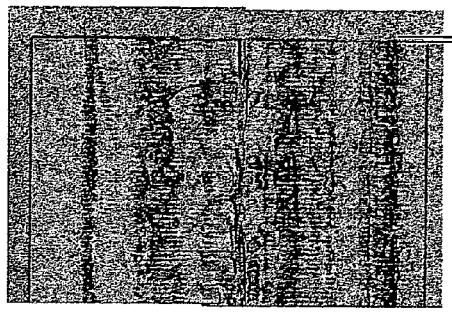
Figure 23:
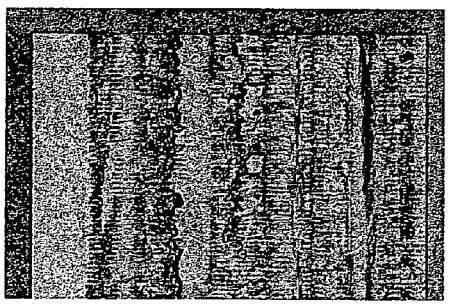

When the quality modified region 71 is formed at a position where the distance between the front face 3 of the substrate 4 and the end part of the quality modified region 71 on the front face side is 5 µm to 15 µm, the skirt width S can be suppressed to 1 µm or less as shown in FIG. 23, whereby the end part of the substrate 4 on the front face 3 side and the laminate part 16 can be cut along the lines to cut 5 with a higher precision. In terms of the distance between the front face 3 of the substrate 4 and the end part of the quality modified region 71 on the rear face side, the quality modified region 71 is preferably formed at a position where the distance is [5+(the thickness of substrate 4)×0.1] µm to [20+(the thickness of substrate 4)×0.1] µm, more preferably at a position where the distance is [5+(the thickness of substrate 4)×0.1] µm to [10+(the thickness of substrate 4)×0.1] µm. When the quality modified region is formed under such a condition, the end part of the substrate 4 on the front face 3 side and the laminate part 16 can be cut along the lines to cut 5 with a higher precision.

In FIG. 23, the light-converging position refers to the distance from the rear face 21 to the position at which the light-converging point P of laser light L is located, whereas the energy refers to the energy at the time of forming the quality modified region 71. The rear side end part position refers to the distance from the rear face 21 to the end part of the quality modified region 71 on the rear face side. The width refers to the distance between the end part of the quality modified region 71 on the front face side and the end part thereof on the rear face side. The front side end part position refers to the distance from the front face 3 to the end part of the quality modified region 71 on the front face side.

Figure 24:
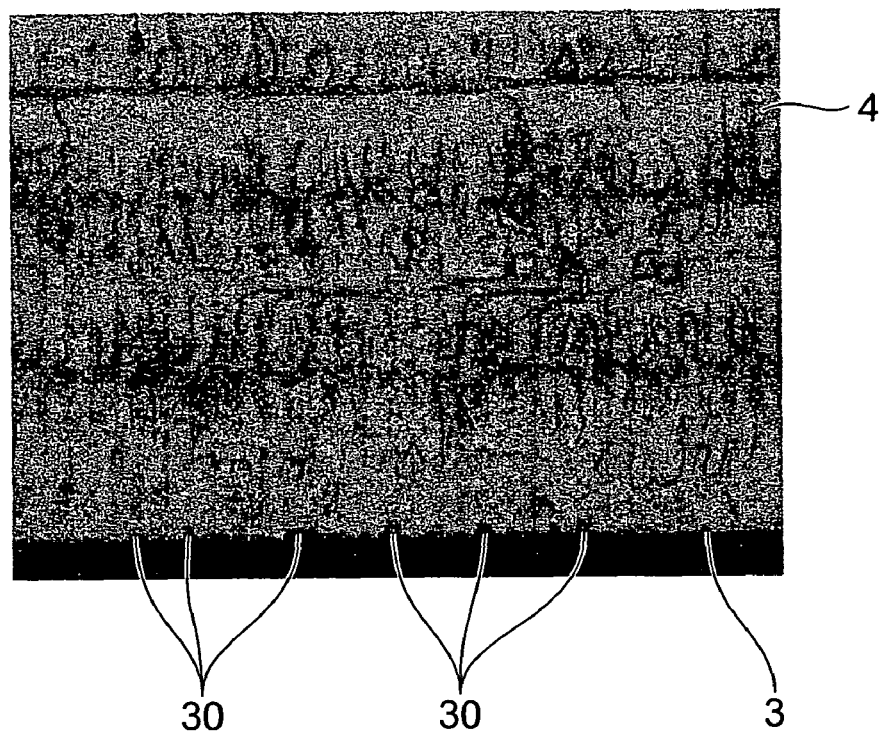
FIG. 24 is a view showing a photograph of a cut section of the substrate in the case where the light-converging point of laser light is located at a position distanced by 3 µm from the front face while the laser light energy is 15 µJ when forming an HC modified region.

When the distance between the front face 3 of the substrate 4 and the end part of the quality modified region 71 on the front face side is less than 5 µm, damages 30 such as melting are likely to occur in the front face 3 of the substrate 4 as shown in FIG. 24. FIG. 24 is a view showing a photograph of a cut section of the substrate 4 in the case where the position at which the light-converging point of laser light L is located when forming the quality modified region 71 is distanced from the front face 3 by 3 µm while the energy of laser light is 15 µJ.

(9) Widths of Modified Regions 71, 72, 73

The width of the HC modified region 73 (the total of widths of HC modified regions 73 if they are formed in a plurality of rows) in the thickness direction of the substrate 4 is preferably 110 µm or less. When the HC modified region 73 is formed under such a condition, fractures 24 reaching the rear face 21 of the substrate 4 from the HC modified region 73 tend to be formed along the lines to cut 5 with a high precision. When the width of the HC modified region 73 exceeds 110 µm, fractures 24 reaching the rear face 21 of the substrate 4 from the HC modified region 73 are likely to deviate from the lines to cut 5.

The total of widths of the segmented modified regions 72 in the thickness direction of the substrate 4 is preferably 40 µm to [(the thickness of substrate 4)×0.9] µm. When the segmented modified regions 72 are formed under such a condition, fractures starting from the segmented modified regions 72 tend to occur along the lines to cut 5 with a high precision at the time of cutting the substrate 4 and laminate part 16, whereby the cut section 4a of the substrate 4 in each semiconductor chip 25 becomes a highly accurate cut section. When the total of widths of the segmented modified regions 72 is less than 40 µm, fractures starting from the segmented modified regions 72 are harder to occur at the time of cutting the substrate 4 and laminate part 16, whereby the cut section 4a of the substrate 4 in the semiconductor chip 25 is less likely to become a highly accurate cut section. When the total of widths of the segmented modified regions 72 exceeds [(the thickness of substrate 4)×0.9] µm, fractures starting from the segmented modified regions 72 are likely to deviate from the lines to cut 5 when cutting the substrate 4 and laminate part 16, whereby the cut section 4a of the substrate 4 in the semiconductor chip 25 is harder to become a highly accurate cut section.

Preferably, the width of the quality modified region 71 in the thickness direction of the substrate 4 is not greater than [(the thickness of substrate 4)×0.1] µm. When the quality modified region 71 is formed under such a condition, fractures starting from the quality modified region 71 tend to reach the laminate part 16 along the lines to cut 5 with a high precision at the time of cutting the substrate 4 and laminate part 16. When the width of the quality modified region 71 exceeds [(the thickness of substrate 4)×0.1] µm, fractures starting from the quality modified region 71 are likely to reach the laminate part 16 while deviating from the lines to cut 5 at the time of cutting the substrate 4 and laminate part 16.

Results of processing concerning FIG. 25 will now be explained.

Figure 25:
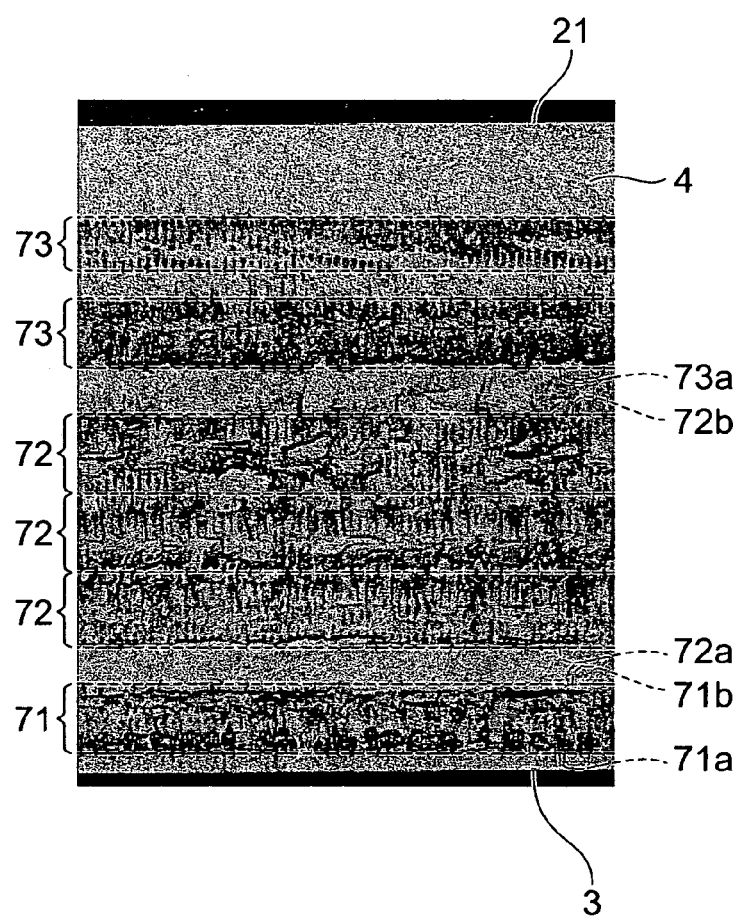
FIG. 25 is a view showing a photograph of a cut section of a substrate cut by using the laser processing method in accordance with the embodiment.

FIG. 25 is a view showing a photograph of a cut section 4a of a substrate 4 cut by using the above-mentioned laser processing method. As mentioned above, the substrate 4 is made of silicon and has a thickness of 290 μm. Forming conditions of the modified regions 71, 72, 73 are listed in the following Table 7. In Table 7, the light-converging position refers to the distance from the rear face 21 to a position where the light-converging point P of laser light L is located, whereas the energy refers to the energy of laser light L at the time of forming the modified regions 71, 72, 73. The pulse width at the time of forming the modified regions 71, 72, 73 is 150 ns, whereas the interval (which will hereinafter be referred to as laser light irradiation position interval) between positions where respective pulses of laser light L are located when irradiating the laser light L along the lines to cut 5 (positions locating the light-converging point P) is 3.75 μm.

TABLE 7

|  | LIGHT-CONVERGING POSITION (μm) | ENERGY (μJ) |
|---|---|---|
| QUALITY MODIFIED REGION 71 | 275 | 7 |
| SEGMENTED MODIFIED REGION 72 (FRONT FACE 3 SIDE) | 228 | 14 |
| SEGMENTED MODIFIED REGION 72 | 194 | 14 |
| SEGMENTED MODIFIED REGION 72 (REAR FACE 21 SIDE) | 165 | 14 |
| HC MODIFIED REGION 73 (FRONT FACE 3 SIDE) | 104 | 14 |
| HC MODIFIED REGION 73 (REAR FACE 21 SIDE) | 57 | 9 |

Here, in the thickness direction of the substrate 4, the quality modified region 71 had a width of about 22 μm, each segmented modified region 72 had a width of about 33 μm, the HC modified region 73 on the front face 3 side had a width of about 28 μm, and the HC modified region 73 on the rear face 21 side had a width of about 20 μm. The distance between the front face 3 and the end part 71a of the quality modified region 71 on the front face side was about 8 μm, the distance between the end part 71b of the quality modified region 71 on the rear face side and the end part 72a of the segmented modified region 72 on the front face side opposing each other was about 25 μm, and the distance between the end part 72b of the segmented modified region 72 on the rear face side and the end part 73a of the quality modified region 73 on the front face side was about 25 μm. The segmented modified regions 72 were formed in series in the thickness direction of the substrate 4.

When the modified layers are formed as in the foregoing, it can be suppressed as compared with FIG. 20, that bumps occur in fractures extending from the HC modified region 73 on the front face 3 side (The bumps make a cleavage plane rough). This can prevent the bumps from generating a molten pool in the cleavage plane upon laser irradiation at the time of forming the HC modified region 73 on the rear face 21 side and thereby yielding large particles of dust.

As a condition for this purpose, the energy of laser light for forming the HC modified region 73 on the front face 3 side is made greater than that for forming the HC modified region 73 on the rear face 21 side in this example, whereas these modified regions are formed by the same energy of laser light in the example of FIG. 20.

In this case, the energy of laser light at the time of forming the HC modified region 73 on the front face 3 side is under the same condition as with the energy condition of the laser light L at the time of forming the segmented modified regions 72 mentioned above. Namely, the energy is preferably 2 μJ to 50 μJ. More specifically, the energy is preferably 2 μJ to 20 μJ (more preferably 2 μJ to 15 μJ) when the transmittance of laser light L in the substrate 4 is 30% or higher, and 3 μJ to 50 μJ (more preferably 3 μJ to 45 μJ) when the transmittance of laser light L in the substrate 4 is 15% or less.

The energy of laser light at the time of forming the HC modified region 73 on the front face 3 side when the energy for the HC modified region 73 on the rear face 21 side is taken as 1 is under the same condition as with the energy of laser light L at the time of forming the segmented modified region 72 (i.e., the energy condition of laser light at the time of forming the segmented modified regions 72 while the energy for the HC modified region 73 is taken as 1), which will be explained later.

Namely, when the energy for the HC modified region 73 on the rear face 21 side is taken as 1, the energy of laser light L at the time of forming the HC modified region 73 on the front face 3 side is preferably 1.3 to 3.3. More specifically, the energy is preferably 1.3 to 3.0 when the transmittance of laser light L in the substrate 4 is 30% or higher, and 1.5 to 3.3 when the transmittance is 15% or less.

(10) Relationship Between the Energy of Laser Light L for Forming Segmented Modified Regions 72 and That for Forming HC Modified Regions 73

As can be seen from data of the following Table 8, when forming a plurality of rows of HC modified regions 73, the energy of laser light at the time of forming the segmented modified regions 72 is preferably 1.3 to 3.3 in the case where the energy of laser light L at the time of forming the HC modified region 73 closest to the rear face 21 of the substrate 4 is taken as 1. More specifically, the energy is preferably 1.3 to 3.0 when the transmittance of laser light L in the substrate 4 is 30% or higher, and 1.5 to 3.3 when the transmittance is 15% or less.

When a plurality of HC modified regions 73 are formed under such a condition, fractures 24 generated when forming the HC modified region 73 second closest to the rear face 21 of the substrate 4 do not reach the vicinity of the rear face 21 of the substrate 4, whereby particles of dust can be prevented from occurring as the inner face of fractures 24 melts at the time of forming the HC modified region 73 closest to the rear face 21 of the substrate 4.

TABLE 8

| | ENERGY RATIO | | | | | | | |
|---|---|---|---|---|---|---|---|---|
| | 1.0 | 1.1 | 1.3 | 1.4 | 1.5 | 1.6 | 1.7 | 1.8 |
| TRANSMITTANCE ≧30% | X | X | ○ | ○ | ○ | ○ | ○ | ○ |
| TRANSMITTANCE ≦15% | X | X | X | Δ | ○ | ○ | ○ | ○ |

| | ENERGY RATIO | | | | | | | |
|---|---|---|---|---|---|---|---|---|
| | 1.9 | 2.0 | 2.1 | 2.2 | 2.3 | 3.0 | 3.1 | 3.2 |
| TRANSMITTANCE ≧30% | ○ | ○ | ○ | ○ | ○ | ○ | X | X |
| TRANSMITTANCE ≦15% | ○ | ○ | ○ | ○ | ○ | ○ | ○ | ○ |

| | ENERGY RATIO | | | |
|---|---|---|---|---|
| | 3.3 | 3.4 | 3.5 | 3.6 |
| TRANSMITTANCE ≧30% | X | X | X | X |
| TRANSMITTANCE ≦15% | ○ | Δ | X | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: favorable and unfavorable cutting quality parts coexist
"X" on the higher energy side: cutting quality is low, e.g., chipping occurs in cut sections

(11) Energy of Laser Light L When Forming the Quality Modified Region 71

As can be seen from data of the following Table 9, in the case where the energy of laser light L at the time of forming the HC modified region 73 on the rear face 21 side is taken as 1, the energy of laser light L at the time of forming the quality modified region 71 is preferably 0.6 to 1.9 when the transmittance of laser light L in the substrate 4 is 30% or higher, and 0.6 to 3.0 when the transmittance is 15% or less.

When the quality modified region 71 is formed under such a condition, fractures starting from the quality modified region 71 tend to reach the laminate part 16 along the lines to cut 5 with a high precision at the time of cutting the substrate 4 and laminate part 16. When the energy of laser light L is lower than the above-mentioned condition, fractures starting from the quality modified region 71 tend to reach the laminate part 16 while deviating from the lines to cut 5. When the energy of laser light L exceeds the above-mentioned condition, on the other hand, damages such as melting are likely to occur in the laminate part 16.

TABLE 9

| | ENERGY RATIO | | | | | | |
|---|---|---|---|---|---|---|---|
| | 0.3 | 0.4 | 0.5 | 0.6 | 0.7 | 0.8 | 0.9 |
| TRANSMITTANCE ≧30% | X | X | Δ | ◯ | ◯ | ◯ | ◯ |
| TRANSMITTANCE ≦15% | X | X | Δ | ◯ | ◯ | ◯ | ◯ |

| | ENERGY RATIO | | | | | | | |
|---|---|---|---|---|---|---|---|---|
| | 1.0 | 1.1 | 1.3 | 1.4 | 1.5 | 1.6 | 1.7 | 1.8 |
| TRANSMITTANCE ≧30% | ◯ | ◯ | ◯ | ◯ | ◯ | ◯ | ◯ | ◯ |
| TRANSMITTANCE ≦15% | ◯ | ◯ | ◯ | ◯ | ◯ | ◯ | ◯ | ◯ |

| | ENERGY RATIO | | | | | | | |
|---|---|---|---|---|---|---|---|---|
| | 1.9 | 2.0 | 2.1 | 2.2 | 2.3 | 3.0 | 3.1 | 3.2 |
| TRANSMITTANCE ≧30% | ◯ | Δ | X | X | X | X | X | X |
| TRANSMITTANCE ≦15% | ◯ | ◯ | ◯ | ◯ | ◯ | ◯ | Δ | X |

"Δ" on the lower energy side: favorable and unfavorable cutting quality parts coexist
"X" on the lower energy side: fractures do not occur unless an excessive stress is applied, whereby cutting quality is unfavorable
"Δ" on the higher energy side: damages such as melting partly occur in the laminate part 16
"X" on the higher energy side: damages such as melting occur in the laminate part 16

The energy of laser light at the time of forming the quality modified region 71 is as with data of the above-mentioned Table 6. Namely, the energy is preferably 2 µJ to 50 µJ. More specifically, the energy is preferably 2 µJ to 20 µJ (more preferably 2 µJ to 15 µJ) when the transmittance of laser light L in the substrate 4 is 30% or higher, and 3 µJ to 50 µJ (more preferably 3 µJ to 45 µJ) when the transmittance is 15% or less.

(12) Forming Positions of HC Modified Regions 73 When Forming a Plurality of Rows of HC Modified Regions 73

When forming a plurality of rows of HC modified regions 73, it will be preferred if the position at which the light-converging point P of laser light L is located when forming the HC modified region 73 closest to the rear face 21 of the substrate 4 is distanced from the rear face 21 by 20 µm to 110 µm, and the position at which the light-converging point P of laser light L is located when forming the HC modified region 73 second closest to the rear face 21 of the substrate 4 is distanced from the rear face 21 by 140 µm or less.

When a plurality of rows of HC modified regions 73 are formed under such a condition, fractures 24 generated at the time of forming the HC modified region 73 second closest to the rear face 21 of the substrate 4 do not reach the vicinity of the rear face 21 of the substrate 4, whereby particles of dust can be prevented from occurring as the inner face of the fractures 24 melts at the time of forming the HC modified region 73 closest to the rear face 21 of the substrate 4.

While forming conditions of the modified regions 71, 72, 73 and the like are explained in the foregoing, the pulse width of laser light L at the time of forming the modified regions 71, 72, 73 is preferably 500 ns or less, more preferably 10 ns to 300 ns (further preferably 100 ns to 300 ns). The interval of laser light irradiation positions is preferably 0.1 µm to 10 µm. The interval of laser light irradiation positions can be set appropriately by the repetition frequency of laser and the laser light moving rate.

Figure 26:
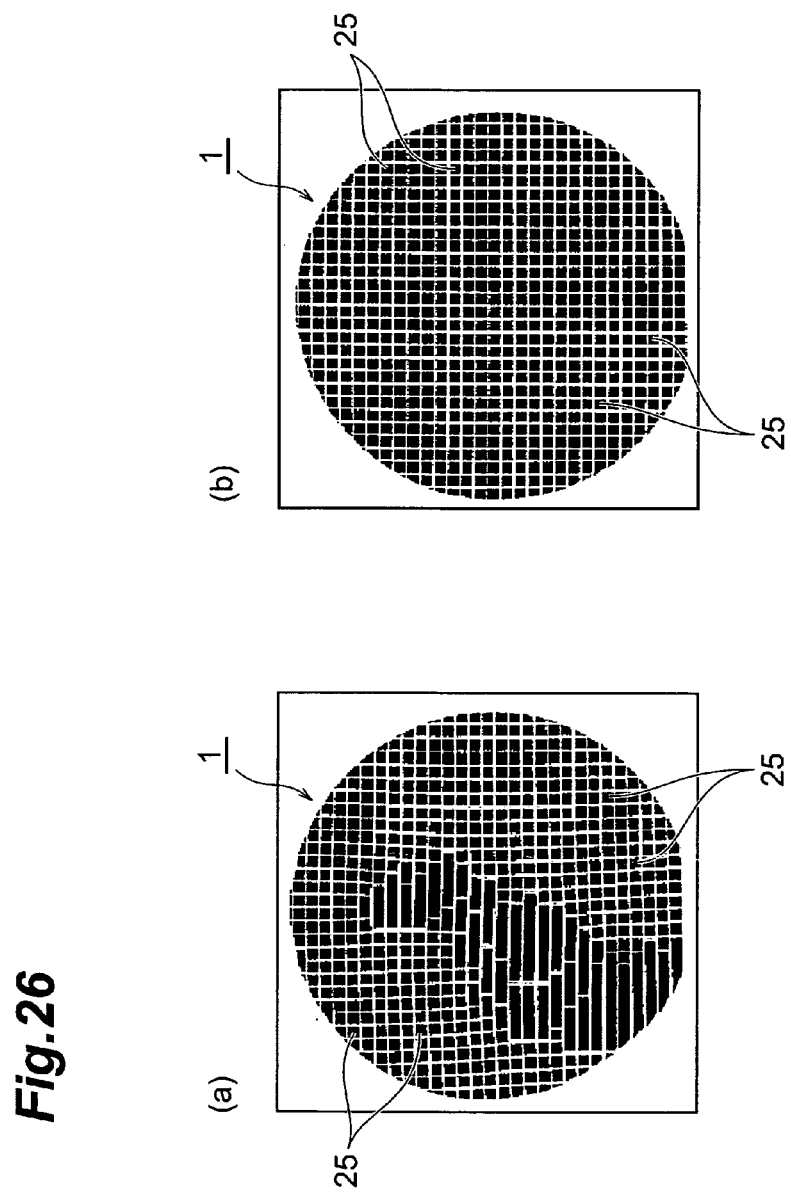
FIG. 26 is a plan view at the time of cutting the object into semiconductor chips, in which (a) shows a case where various forming conditions concerning segmented modified regions are not satisfied when forming the segmented modified regions, whereas (b) shows a case where various forming conditions concerning segmented modified regions are satisfied when forming the segmented modified regions.

When the above-mentioned various forming conditions for the segmented modified regions 72 are not satisfied in the forming of the segmented modified regions 72, a part not cut into semiconductor chips 25 occurs in the object 1 as shown in FIG. 26(a). When the above-mentioned various forming conditions for the segmented modified regions 72 are satisfied, on the other hand, the whole object 1 is reliably cut into the semiconductor chips 25 as shown in FIG. 26(b).

The present invention is not restricted to the above-mentioned embodiment. For example, though the above-mentioned embodiment relates to a case where the modified regions 71, 72, 73 are formed by generating multiphoton absorption within the substrate 4, there are cases where the modified regions 71, 72, 73 are formed by generating optical absorption equivalent to multiphoton absorption within the substrate 4.

Though the above-mentioned embodiment relates to a case where one row of quality modified region 71, three rows of segmented modified regions 72, and two rows of HC modified regions 73 are formed within the substrate 4, the modified regions 71, 72, 73 may be formed within the substrate 4 as follows.

Figure 27:
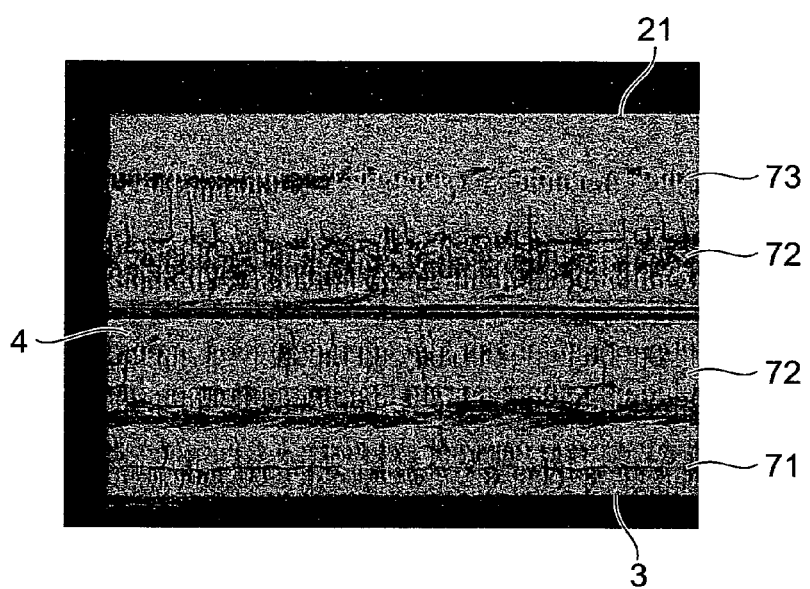
FIG. 27 is a photograph showing a cut section of a substrate where 1 row of quality modified region, 2 rows of segmented modified regions, and 1 row of HC modified region are formed.

For example, as shown in FIG. 27, one row of quality modified region 71, two rows of segmented modified regions 72, and one row of HC modified region 73 may be formed within the substrate 4 successively from the front face 3 side of the substrate 4. Here, the substrate 4 is made of silicon and has a thickness of 200 µm. Forming conditions of the modified regions 71, 72, 73 are shown in the following Table 10. Here, at the time of forming the modified regions 71, 72, 73, the pulse width of laser light L is 150 ns, whereas the interval of laser light irradiation positions is 4 µm.

TABLE 10

| | LIGHT-CONVERGING POSITION (µm) | ENERGY (µJ) |
|---|---|---|
| QUALITY MODIFIED REGION 71 | 167 | 15 |
| SEGMENTED MODIFIED REGION 72 (FRONT FACE 3 SIDE) | 121 | 20 |
| SEGMENTED MODIFIED REGION 72 (REAR FACE 21 SIDE) | 71 | 20 |
| HC MODIFIED REGION 73 | 39 | 10 |

Figure 28:
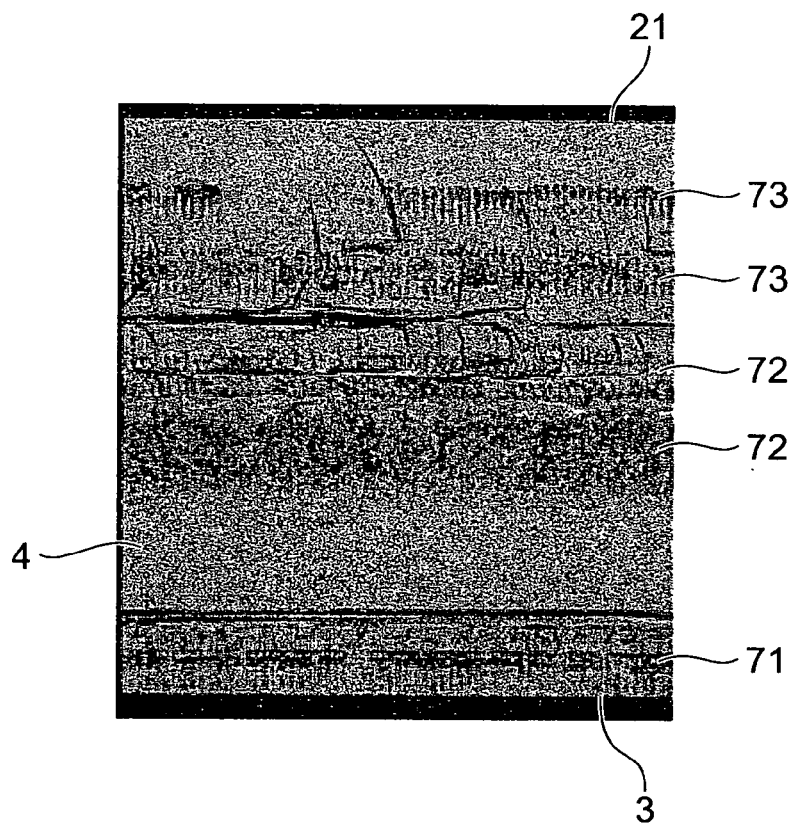
FIG. 28 is a photograph showing a cut section of a substrate where 1 row of quality modified region, 2 rows of segmented modified regions, and 2 rows of HC modified regions are formed.

As shown in FIG. 28, one row of quality modified region 71, two rows of segmented modified regions 72, and two rows of HC modified regions 73 may be formed within the substrate 4 successively from the front face 3 side of the substrate 4. Here, the substrate 4 is made of silicon and has a thickness of 300 µm. Forming conditions of the modified regions 71, 72, 73 are shown in the following Table 11. Here, at the time of forming the modified regions 71, 72, 73, the pulse width of laser light L is 150 ns, whereas the interval of laser light irradiation positions is 4 µm in the quality modified region 71, 1 µm in the quality modified region 72 (on the front face 3 side), 4 µm in the quality modified region 72 (on the rear face 21 side), 4 µm in the HC modified region 73 (on the front face 3 side), and 4 µm in the HC modified region 73 (on the rear face 21 side).

TABLE 11

|  | LIGHT-CONVERGING POSITION (µm) | ENERGY (µJ) |
|---|---|---|
| QUALITY MODIFIED REGION 71 | 256 | 15 |
| SEGMENTED MODIFIED REGION 72 (FRONT FACE 3 SIDE) | 153 | 20 |
| SEGMENTED MODIFIED REGION 72 (REAR FACE 21 SIDE) | 121 | 20 |
| HC MODIFIED REGION 73 (FRONT FACE 3 SIDE) | 71 | 10 |
| HC MODIFIED REGION 73 (REAR FACE 21 SIDE) | 39 | 10 |

Figure 29:
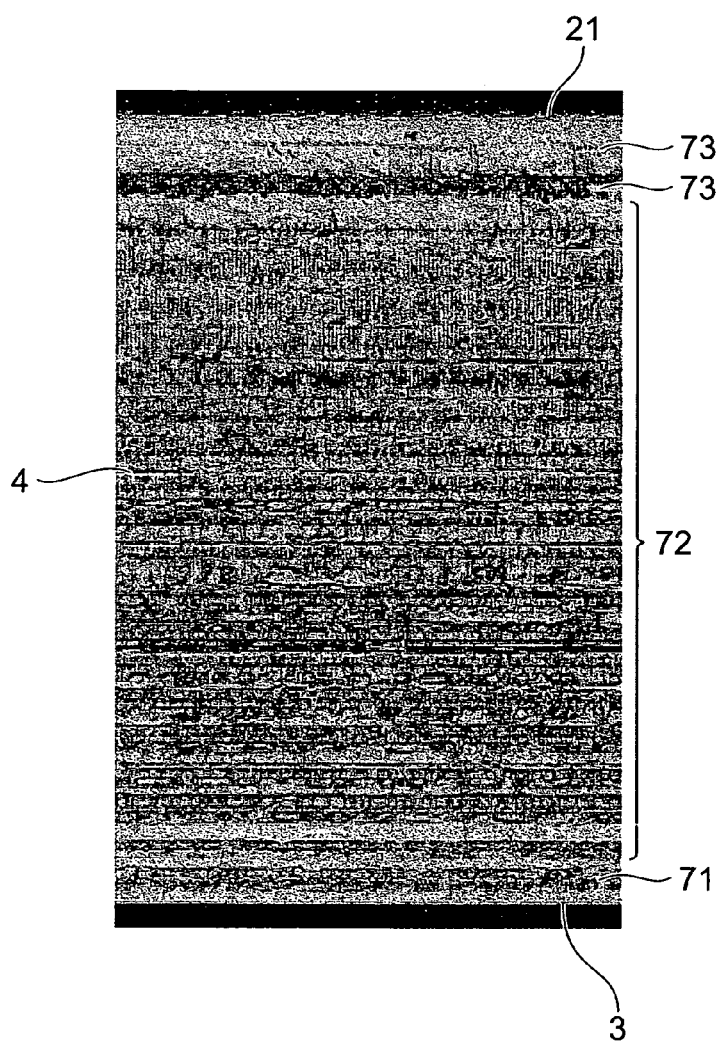
FIG. 29 is a photograph showing a cut section of a substrate where 1 row of quality modified region, 19 rows of segmented modified regions, and 2 rows of HC modified regions are formed.

As shown in FIG. 29, 1 row of quality modified region 71, 19 rows of segmented modified regions 72, and 1 row of HC modified region 73 may be formed within the substrate 4 successively from the front face 3 side of the substrate 4. Here, the substrate 4 is made of silicon and has a thickness of 725 µm. Forming conditions of the modified regions 71, 72, 73 are shown in the following Table 12. Here, at the time of forming the modified regions 71, 72, 73, the pulse width of laser light L is 150 ns, whereas the interval of laser light irradiation positions is 4 µm.

TABLE 12

|  | LIGHT-CONVERGING POSITION (µm) | ENERGY (µJ) |
|---|---|---|
| QUALITY MODIFIED REGION 71 | 644 | 15 |
| SEGMENTED MODIFIED REGION 72 (FRONT FACE 3 SIDE) | 641 | 20 |
| SEGMENTED MODIFIED REGION 72 | 612 | 20 |
| SEGMENTED MODIFIED REGION 72 | 584 | 20 |
| SEGMENTED MODIFIED REGION 72 | 555 | 20 |
| SEGMENTED MODIFIED REGION 72 | 527 | 20 |
| SEGMENTED MODIFIED REGION 72 | 498 | 20 |
| SEGMENTED MODIFIED REGION 72 | 470 | 20 |
| SEGMENTED MODIFIED REGION 72 | 441 | 20 |
| SEGMENTED MODIFIED REGION 72 | 413 | 20 |
| SEGMENTED MODIFIED REGION 72 | 384 | 20 |
| SEGMENTED MODIFIED REGION 72 | 356 | 20 |
| SEGMENTED MODIFIED REGION 72 | 328 | 20 |
| SEGMENTED MODIFIED REGION 72 | 299 | 20 |
| SEGMENTED MODIFIED REGION 72 | 271 | 20 |
| SEGMENTED MODIFIED REGION 72 | 242 | 20 |
| SEGMENTED MODIFIED REGION 72 | 214 | 20 |
| SEGMENTED MODIFIED REGION 72 | 185 | 20 |
| SEGMENTED MODIFIED REGION 72 | 157 | 20 |
| SEGMENTED MODIFIED REGION 72 (REAR FACE 21 SIDE) | 121 | 20 |
| HC MODIFIED REGION 73 (FRONT FACE 3 SIDE) | 71 | 10 |
| HC MODIFIED REGION 73 (REAR FACE 21 SIDE) | 39 | 10 |

In Tables 10 to 12, the light-converging position refers to the distance from the rear face 21 to a position where the light-converging point P of laser light L is located, whereas the energy refers to the energy of laser light L at the time of forming the modified regions 71, 72, 73.

INDUSTRIAL APPLICABILITY

Even when a substrate formed with a laminate part including a plurality of functional devices is thick, the present invention can cut the substrate and laminate part with a high precision.

The invention claimed is:

1. A laser processing method of irradiating a substrate having a front face formed with a laminate part including a plurality of functional devices with laser light while locating a light-converging point within the substrate so as to form a modified region to become a start point for cutting within the substrate along a line to cut of the substrate, the method comprising the steps of:

forming a first modified region along the line to cut at a position where a distance between the front face of the substrate and an end part of the first modified region on the front face side of the substrate is 5 µm to 15 µm; and forming at least one row of a second modified region along the line to cut at a position between the first modified region and a rear face of the substrate.

2. A laser processing method according to claim 1, wherein the first modified region is formed at a position where the distance between the front face of the substrate and the end part of the first modified region on the front face side of the substrate is 5 µm to 10 µm.

3. A laser processing method according to claim 1, wherein the substrate is a semiconductor substrate, and wherein the first and second modified regions include a molten processed region.

4. A laser processing method according to claim 1, wherein the first and second modified regions are successively formed one by one from the side farther from the rear face while using the rear face as a laser light entrance surface.

5. A laser processing method according to claim 1, wherein the laser light has an energy of 2 µJ to 50 µJ when forming the first modified region.

6. A laser processing method according to claim 1, wherein the laser light has an energy of 1 µJ to 50 µJ when forming the second modified region.

7. A laser processing method according to claim 1, wherein the light-converging point of the laser light is located at a position distanced by 50 µm to [(the substrate thickness)×0.9] µm from the rear face side of the substrate when forming the second modified region.

8. A laser processing method according to claim 1, wherein the light-converging point of the laser light is located at a position distanced by 20 µm to 110 µm from the rear face side of the substrate when forming the second modified region.

9. A laser processing method according to claim 1, further comprising the step of cutting the substrate and laminate part along the line to cut.

10. A laser processing method of irradiating a substrate having a front face formed with a laminate part including a plurality of functional devices with laser light while locating a light-converging point within the substrate so as to form a modified region to become a start point for cutting within the substrate along a line to cut of the substrate, the method comprising the step of forming a first modified region along the line to cut at a position where a distance between the front face of the substrate and an end part of the first modified region on the front face side of the substrate is 5 µm to 15 µm.

11. A laser processing method according to claim 10, wherein the first modified region is formed at a position where the distance between the front face of the substrate and the end part of the first modified region on the front face side of the substrate is 5 μm to 10 μm.

12. A laser processing method of irradiating a substrate having a front face formed with a laminate part including a plurality of functional devices with laser light while locating a light-converging point within the substrate so as to form a modified region to become a start point for cutting within the substrate along a line to cut of the substrate, the method comprising the steps of:

forming a first modified region along the line to cut at a position where a distance between the front face of the substrate and an end part of the first modified region on a rear face side of the substrate is [5+(the substrate thickness)×0.1] μm to [20+(the substrate thickness)×0.1] μm; and forming at least one row of a second modified region along the line to cut at a position between the first modified region and a rear face of the substrate.

13. A laser processing method according to claim 12, wherein the first modified region is formed at a position where the distance between the front face of the substrate and the end part of the first modified region on the rear face side is [5+(the substrate thickness)×0.1] μm to [10+(the substrate thickness)×0.1] μm.

14. A laser processing of irradiating a substrate having a front face formed with a laminate part including a plurality of functional devices with laser light while locating a light-converging point within the substrate so as to form a modified region to become a start point for cutting within the substrate along a line to cut of the substrate, the method comprising the step of forming a first modified region along the line to cut at a position where a distance between the front face of the substrate and an end part of the first modified region on a rear face side of the substrate is [5+(the substrate thickness)×0.1] μm to [20+(the substrate thickness)×0.1] μm.

15. A laser processing method according to claim 14, wherein the first modified region is formed at a position where the distance between the front face of the substrate and the end part of the first modified region on the rear face side is [5+(the substrate thickness)×0.1] μm to [10+(the substrate thickness)×0.1] μm.

16. A semiconductor chip comprising a substrate; and a laminate part, disposed on a front face of the substrate, including a functional device;

wherein a first modified region extending along a rear face of the substrate is formed at a position where a distance between the front face of the substrate and an end part of the first modified region on the front face side of the substrate is 5 μm to 15 μm in a side face of the substrate; and wherein at least one row of a second modified region extending along the rear face is formed at a position between the first modified region and the rear face in the side face of the substrate.

17. A semiconductor chip according to claim 16, wherein the substrate is a semiconductor substrate, and wherein the first and second modified regions include a molten processed region.

18. A semiconductor chip according to claim 16, wherein the distance between the end part of the first modified region on the rear face side and the end part of the second modified region on the front face side opposing each other is 0 μm to [(the substrate thickness)−(the substrate thickness)×0.6] μm.

19. A semiconductor chip comprising a substrate; and a laminate part, disposed on a front face of the substrate, including a functional device;

wherein a first modified region extending along a rear face of the substrate is formed at a position where a distance between the front face of the substrate and an end part of the first modified region on the front face side of the substrate is 5 μm to 15 μm in a side face of the substrate.

20. A semiconductor chip comprising a substrate; and a laminate part, disposed on a front face of the substrate, including a functional device;

wherein a first modified region extending along a rear face of the substrate is formed at a position where a distance between the front face of the substrate and an end part of the first modified region on the rear face side of the substrate is [5+(the substrate thickness)×0.1] μm to [20+(the substrate thickness)×0.1] μm in a side face of the substrate; and wherein at least one row of a second modified region extending along the rear face is formed at a position between the first modified region and the rear face in the side face of the substrate.

21. A semiconductor chip comprising a substrate; and a laminate part, disposed on a front face of the substrate, including a functional device;

wherein a first modified region extending along a rear face of the substrate is formed at a position where a distance between the front face of the substrate and an end part of the first modified region on the rear face side of the substrate is [5+(the substrate thickness)×0.1] μm to [20+(the substrate thickness)×0.1] μm in a side face of the substrate.

* * * * *